United States Patent
Zhang et al.

(10) Patent No.: US 11,677,540 B1
(45) Date of Patent: Jun. 13, 2023

(54) SYSTEMS AND METHODS FOR DATA FRAME AND DATA SYMBOL SYNCHRONIZATION IN A COMMUNICATION NETWORK

(71) Applicant: CABLE TELEVISION LABORATORIES, INC., Louisville, CO (US)

(72) Inventors: Junwen Zhang, Broomfield, CO (US); Mu Xu, Broomfield, CO (US); Haipeng Zhang, Broomfield, CO (US); Zhensheng Jia, Superior, CO (US); Luis Alberto Campos, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 144 days.

(21) Appl. No.: 17/161,169

(22) Filed: Jan. 28, 2021

Related U.S. Application Data

(60) Provisional application No. 62/966,660, filed on Jan. 28, 2020.

(51) Int. Cl.
| | |
|---|---|
| *H04L 7/04* | (2006.01) |
| *H04J 3/06* | (2006.01) |
| *H04L 7/00* | (2006.01) |
| *H04B 3/54* | (2006.01) |
| *H04L 27/36* | (2006.01) |

(52) U.S. Cl.
CPC ............ *H04L 7/042* (2013.01); *H04B 3/542* (2013.01); *H04J 3/0638* (2013.01); *H04L 7/0075* (2013.01); *H04L 27/365* (2013.01)

(58) Field of Classification Search
CPC ..... H04L 7/042; H04L 7/0075; H04L 27/365; H04B 3/542; H04J 3/0638
See application file for complete search history.

(56) References Cited

U.S. PATENT DOCUMENTS

| | | |
|---|---|---|
| 5,373,382 A | 12/1994 | Pirio et al. |
| 5,793,512 A | 8/1998 | Ryu |
| 6,765,956 B1 * | 7/2004 | Gatherer ................. H04L 7/042 |
| | | 375/222 |
| 8,265,489 B2 | 9/2012 | Kikuchi |
| 2002/0101264 A1 * | 8/2002 | Natsume ............... H04L 7/0338 |
| | | 327/91 |

(Continued)

OTHER PUBLICATIONS

Generalized Sliding Window Algorithm with Applications to Frame Synchronization—S.M. Pan and D.H.Madill—Aug. 1996.*

*Primary Examiner* — Dac V Ha
(74) *Attorney, Agent, or Firm* — PdZ Patent Law, PLLC

(57) ABSTRACT

A method for synchronizing a data frame and data symbols in a communication system includes generating a training sequence including a serial sequence of data symbols that are conjugate symmetric, inserting the training sequence in a transmitter-side data frame, converting constituent data symbols of the transmitter-side data frame to communication signals, transmitting the communication signals from a transmitter to a receiver, converting the communication signals to a stream of received data symbols, detecting presence of the training sequence in the stream of received data symbols, and identifying a position of a received data frame from the presence of the training sequence.

18 Claims, 19 Drawing Sheets

(56) References Cited

U.S. PATENT DOCUMENTS

| | | |
|---|---|---|
| 2006/0045214 A1* | 3/2006 | Shiina .................... H04L 1/0071 |
| | | 375/341 |
| 2006/0176984 A1* | 8/2006 | Lee ......................... H04L 7/042 |
| | | 375/343 |
| 2007/0217524 A1* | 9/2007 | Wang .................. H04L 27/2656 |
| | | 375/149 |
| 2011/0305457 A1 | 12/2011 | Kikuchi |
| 2012/0213532 A1 | 8/2012 | Hironishi et al. |
| 2013/0243434 A1 | 9/2013 | Endo et al. |
| 2015/0095743 A1 | 4/2015 | Sato |
| 2016/0308664 A1 | 10/2016 | Ishaug et al. |
| 2017/0134569 A1* | 5/2017 | Tu ........................ H04L 27/2613 |
| 2017/0250759 A1 | 8/2017 | Hatae et al. |
| 2018/0076887 A1 | 3/2018 | Roberts et al. |

\* cited by examiner

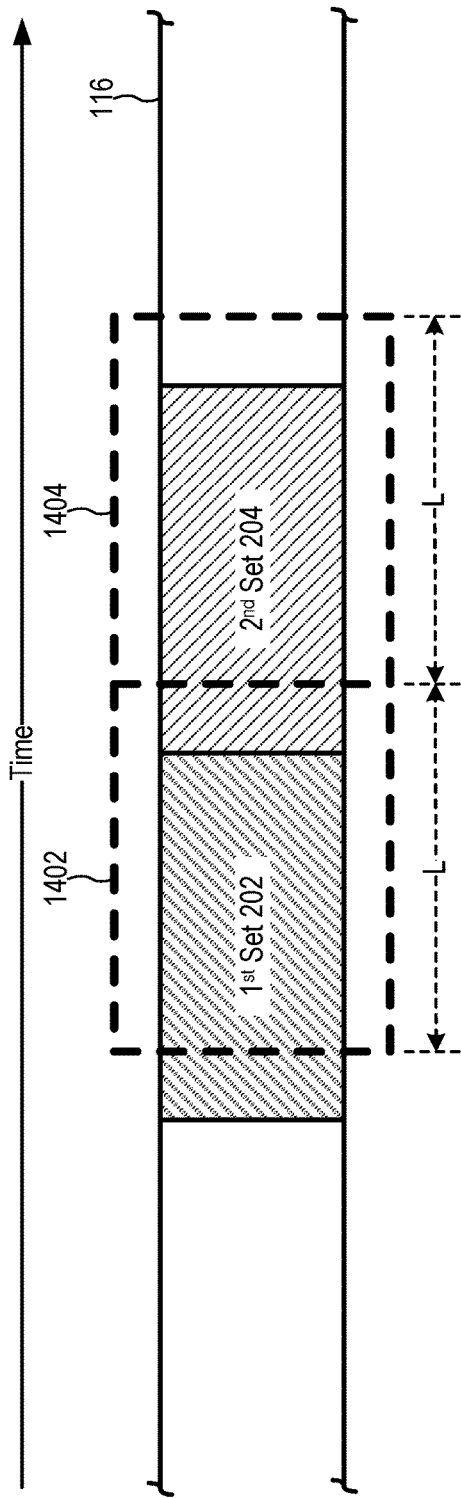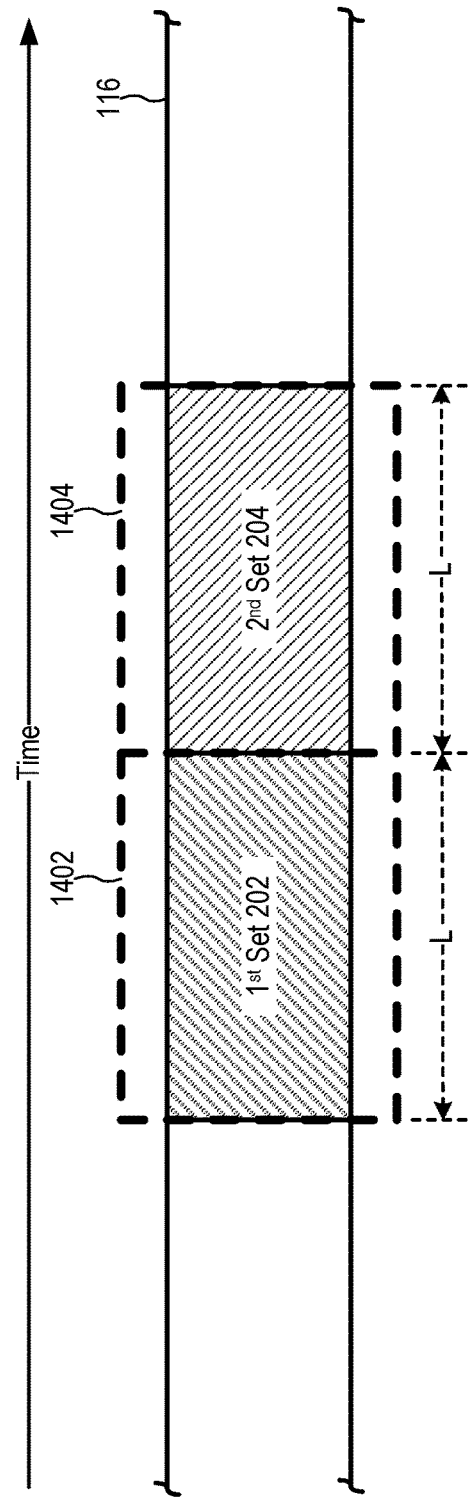

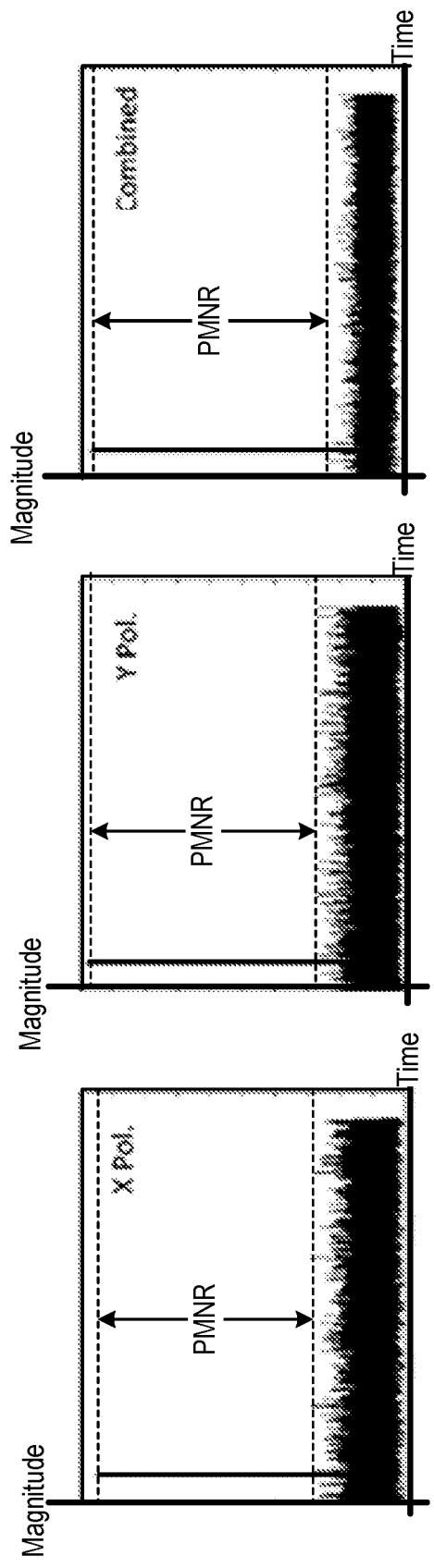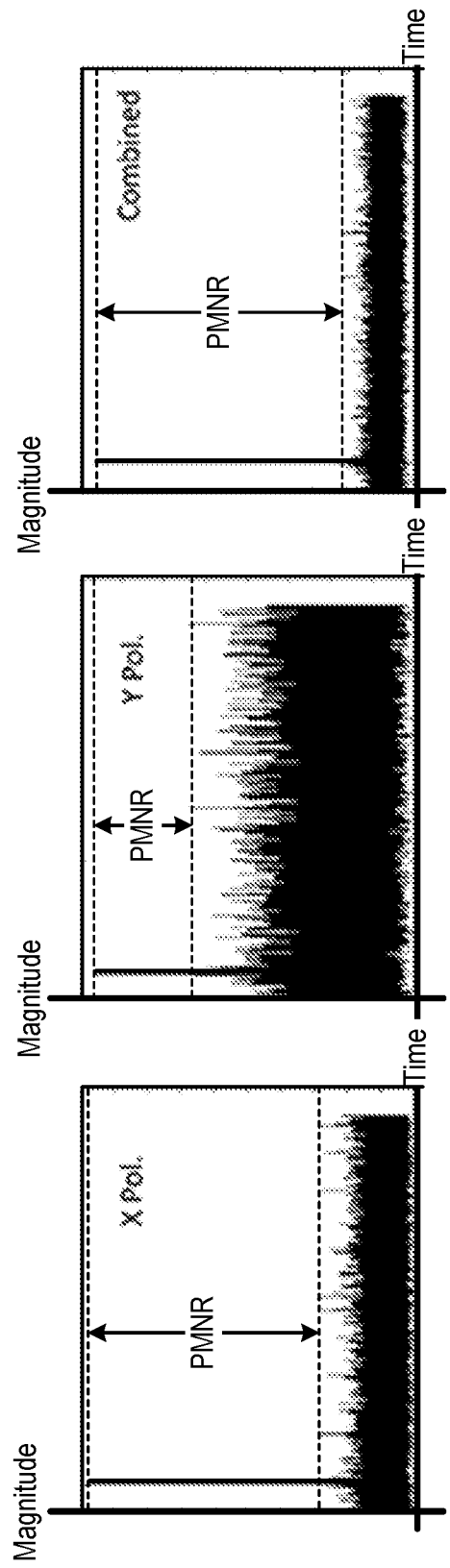

SYSTEMS AND METHODS FOR DATA FRAME AND DATA SYMBOL SYNCHRONIZATION IN A COMMUNICATION NETWORK

RELATED APPLICATIONS

This application claims benefit of priority to U.S. Provisional Patent Application Ser. No. 62/966,660, filed on Jan. 28, 2020, which is incorporated herein by reference.

BACKGROUND

Communication networks are widely used to transmit data between different locations. For example, access communication networks are used to transmit data between a network operator's hub and end users, and long-haul communication networks are used to transmit data over long distances. A communication network may transmit data via a tangible communication medium, such as an optical cable or an electrical cable. A communication network may also transmit data via an intangible communication medium, such as free space, using wireless transceivers.

Data is frequently transmitted in a communication system by serially transmitting data symbols, where each data symbol represents one or more bits of data. For example, a data symbol may be an electrical, optical, or electromagnetic (including in the radio frequency domain) burst or continuous signal on a communication medium. Groups of data symbols are frequently organized into data frames, and a data frame may include, for example, (a) data symbols representing data to be transmitted, sometimes referred to as a "payload," (b) data symbols representing an intended destination of the data frame, and (c) data symbols for use in error checking.

BRIEF DESCRIPTION OF THE DRAWINGS

FIG. 14 is a block diagram of two sliding window samples of received data symbols at a point in time before a training sequence is completely within the two sliding window samples.

FIG. 15 is a block diagram of two sliding window samples of received data symbols at a point in time when a training sequence is completely within the two sliding window samples.

FIGS. 17A-17C illustrate simulated autocorrelation values determined by an embodiment of the FIG. 1 communication system.

FIGS. 18A-18C illustrate simulated autocorrelation values determined by another embodiment of the FIG. 1 communication system.

DETAILED DESCRIPTION OF THE EMBODIMENTS

Figure 1:
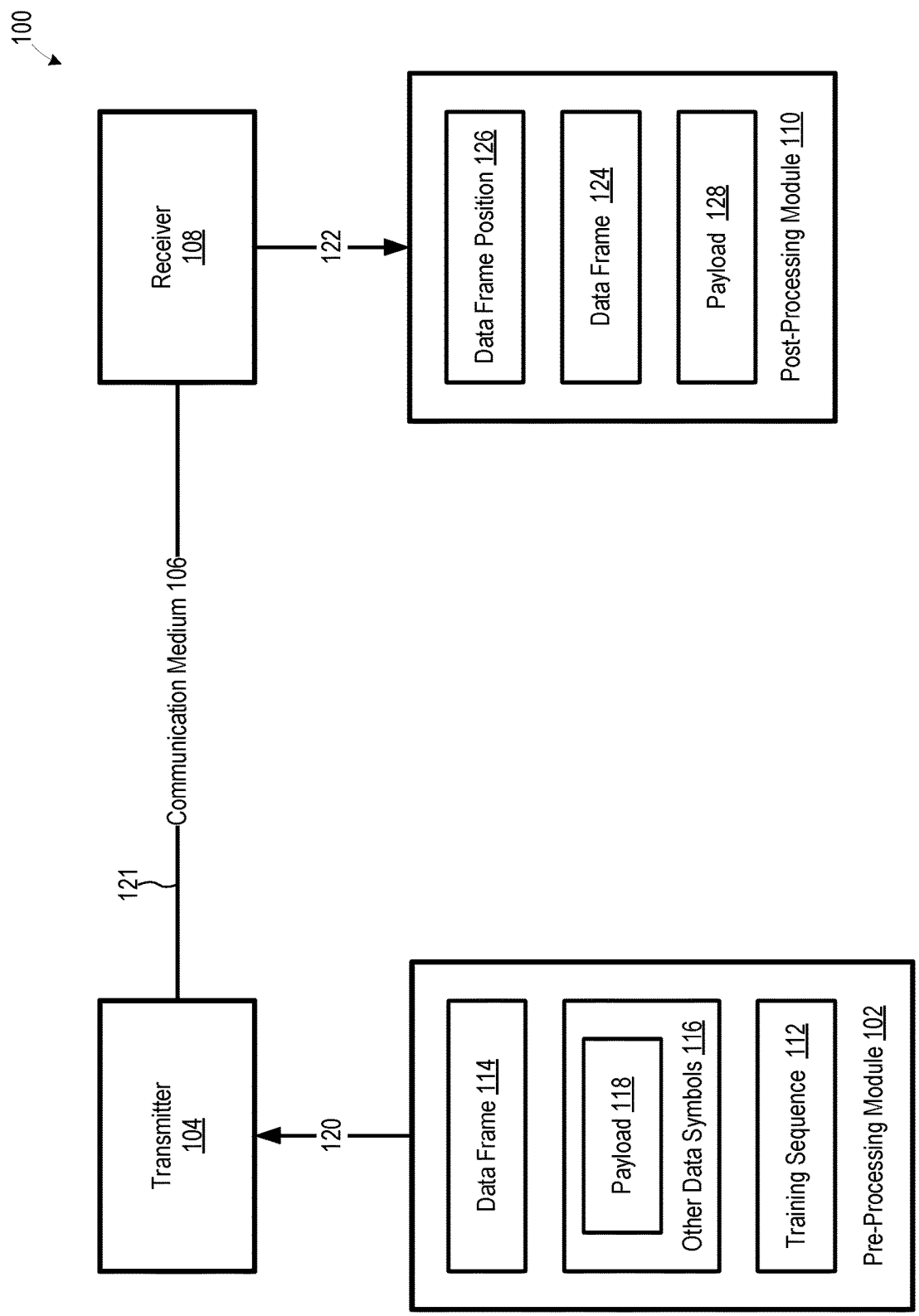
FIG. 1 is a block diagram of a communication system, according to an embodiment.

A communication system receiver that receives a stream of data symbols will need to determine which data frame each data symbol belongs to, so that each data frame may be properly processed to recover its payload. Such association of received data symbols with corresponding data frames is sometimes referred to as data frame and data symbol synchronization. Synchronization can be achieved by detecting a data frame position, e.g., a beginning of data frame, an end of a data frame, or a middle of a data frame, and grouping received data symbols into one or more data frames according to the detected data frame position. For example, consider a hypothetical scenario where each data frame contains M data symbols, where M is a positive integer, and the receiver is configured to the detect a beginning of each data frame. The receiver can synchronize data frames and data symbols by repeatedly (1) detecting a beginning of a data frame and (2) associating the next M received data symbols with the data frame. Accordingly, a communication system receiver may need to be capable of detecting a data frame position from received data symbols.

A communication system may use dedicated synchronization data symbols to detect a data frame's position. For example, a data frame may include a sequence of data symbols, referred to as a training sequence, identifying a particular position of the data frame, e.g., a beginning, end, or mid-point, of the data frame. A receiver can then detect the data frame's position by identifying the training sequence in a stream of received data symbols. For example, a transmitter may insert a training sequence at the beginning of each transmitter-side data frame before sending the data frame to the receiver, and the receiver may identify the beginning of each received data frame by detecting presence of the training sequence in a stream of data symbols received from the transmitter. It is desirable that the training sequence be as short as possible to minimize communication overhead associated with generating, transmitting, and processing the training sequence. On the other hand, the training sequence must be sufficiently long to ensure reliable detection by the receiver, especially under burst reception conditions.

Training sequence detection may be particularly challenging in modern, high-performance communication networks. For example, consider coherent optical communication networks, which transmit data by modulating amplitude, phase, and polarization of an optical carrier signal. Coherent optical communication networks have significant advantages, such as ability to support high bandwidth using advanced modulation formats, ability to transmit data over long distances, and ability to support high split ratio access. However, coherent optical communication networks may present a difficult environment for training sequence detection. For instance, a receiver may receive data symbols from a plurality of transmitters in different respective time slots, which may make it difficult for the receiver to identify a training sequence. Additionally, receiver local oscillator frequency offset, chromatic dispersion, laser phase noise levels, and polarization diversity may complicate training sequence identification in coherent optical communication networks.

Disclosed herein are new systems and methods for data frame and data symbol synchronization which significantly advance the state of the art. The new systems and methods use a training sequence including a plurality of data symbols that are conjugate symmetric, to indicate a data frame position, such as a data frame beginning, a data frame end, or a data frame intermediate point. A receiver can advantageously detect the training sequence using relatively light computational resources by methods that are tolerant of local oscillator frequency offset, laser phase noise, and chromatic dispersion. Accordingly, the new systems and methods may be particularly advantageous in coherent optical communication applications, especially under burst transmission conditions, although the new systems and methods are not limited to use in coherent optical communication networks. Additionally, some embodiments may be adaptively optimized for current networks operating conditions. For example, low-complexity training sequence detection methods may be used under favorable data transmission conditions to promote minimal computational load, while higher-complexity training sequence detection methods may be used to achieve high correlation peak-to-noise ratios under less-favorable data transmission conditions.

FIG. 1 is a block diagram of a communication system 100, which is one embodiment of a communication system implementing the new methods for synchronizing data frames and data symbols. Communication system 100 includes a pre-processing module 102, a transmitter 104, a communication medium 106, a receiver 108, and a post-processing module 110. Although pre-processing module 102, transmitter 104, communication medium 106, receiver 108, and post-processing module 110 are illustrated as being discrete elements, two or more of these elements could be partially or fully combined without departing from the scope hereof. Additionally, any of the elements of communication system 100 could be split into two or more sub-elements, which need not necessarily be disposed at a common location.

Figure 2:
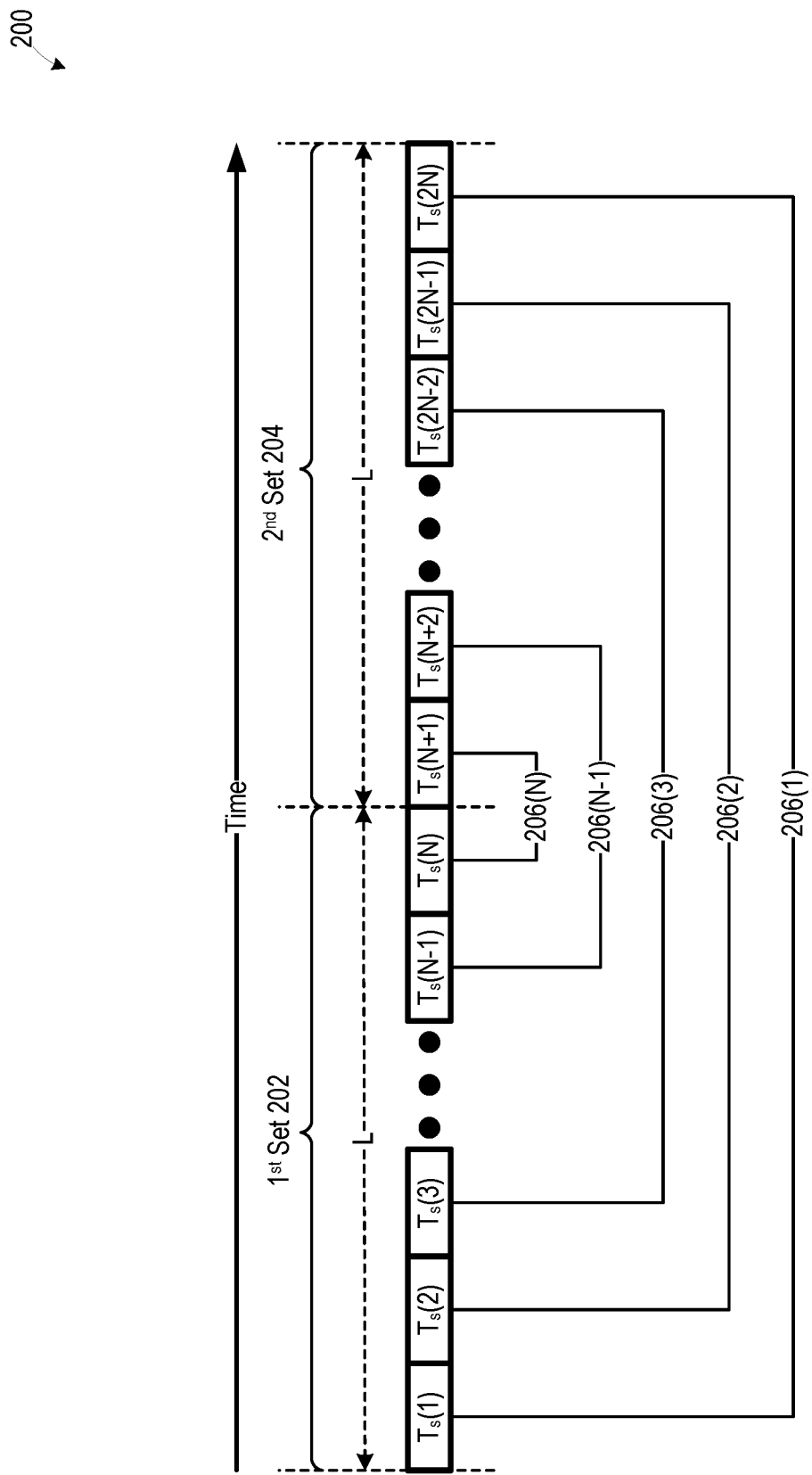
FIG. 2 is a block diagram of a training sequence, according to an embodiment.

Pre-processing module 102 is configured to generate a training sequence 112 of plurality of data symbols that are conjugate symmetric. For example, FIG. 2 is a block diagram of a training sequence 200, which is one embodiment training sequence 112. Training sequence 200 includes a serial sequence of 2N data symbols $T_s$, where N is a positive integer. In this document, specific instances of an item may be referred to by use of a numeral in parentheses (e.g. data symbol $T_s(1)$) while numerals without parentheses refer to any such item (e.g. data symbols $T_s$). N is selected, for example, to achieve a desired balance between low computational complexity, efficient data transmission, and robust training sequence detection. Increasing the value of N increases robustness of training sequence detection, with the tradeoff of increased computational complexity and reduced data transmission efficiency. Conversely, decreasing the value of N increases data transmission efficiency and reduces computational complexity, with the tradeoff of decreased robustness of training sequence detection. Data symbols $T_s$ of training sequence 200 may be in either digital form or analog form, and in some embodiments, the data symbols are generated according to phase shift keying (PSK), quadrature amplitude modulation (QAM), or another modulation format.

Data symbols $T_s$ are grouped into a first set 202 and a second set 204, where each set 202 and 204 has a length L. Length L can be expressed in number of data symbols $T_s$, such that each set 202 and 204 has a length of N data symbols, or length L can be expressed in time. Each data symbol $T_s$ of second set 204 is a complex conjugate of a corresponding data symbol $T_s$ of first set 202, such that training sequence 200 is conjugate symmetric. As known in the art, a conjugate pair is a pair of binomials with different respective middle operations. For example, consider a hypothetical data symbol having a value 2+j3, where "j" is an imaginary operator (sometimes referred to as "i" instead of "j"). A complex conjugate of this hypothetical data symbol has a value of 2−j3, such that 2+j3 and 2−j3 are a complex conjugate pair. Lines 206 in FIG. 2 indicate data symbols $T_s$ that are conjugate pairs. For example, line 206(1) indicates that data symbol $T_s(2N)$ is the complex conjugate of data symbol $T_s(1)$, and line 206(2) indicates that data symbol $T_s(2N-1)$ is the complex conjugate of data symbol $T_s(2)$. Accordingly, the data symbols $T_s$ of training sequence 200 have a relationship as expressed below in EQN. 1, where "*" is a conjugate operator:

$$T_s(k+1)=T_s(2N-k)^*, 0 \leq k \leq N \qquad \text{(EQN. 1)}$$

Figure 3:
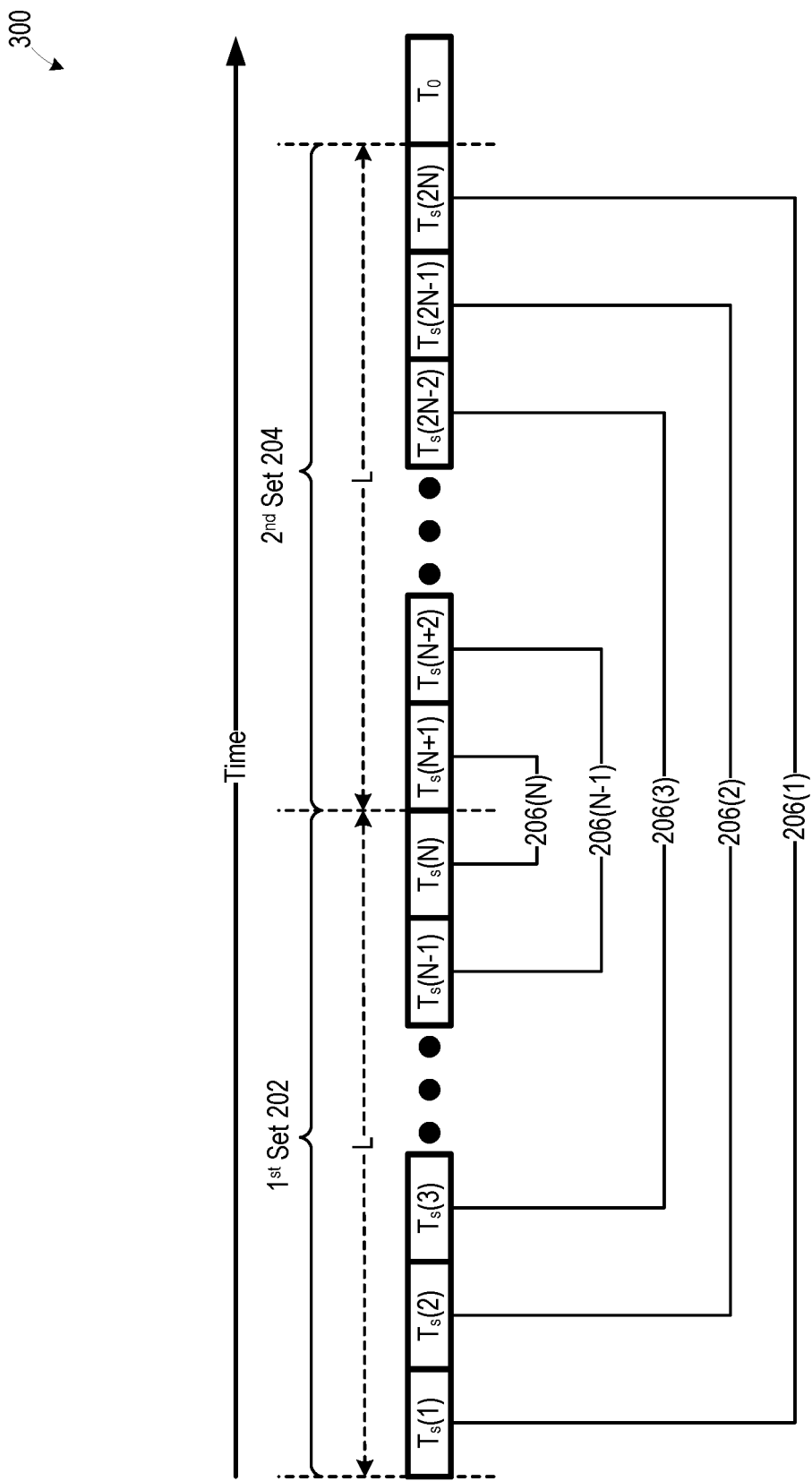
FIG. 3 is a block diagram of an alternate embodiment of the FIG. 2 training sequence having an odd number of data symbols.

Training sequence 200 has an even number of data symbols. However, training sequence 200 could be modified to have an odd number of data symbols by inserting one or more null data symbols, such as having a value of zero, before first set 202, between first and second sets 202 and 204, or after second set 204. For example, FIG. 3 is block diagram of a training sequence 300, which is an alternate embodiment of training sequence 200 further including a data symbol $T_0$ having a value of zero after second set 204, such that training sequence 300 has an odd number of data symbols.

Figure 4:
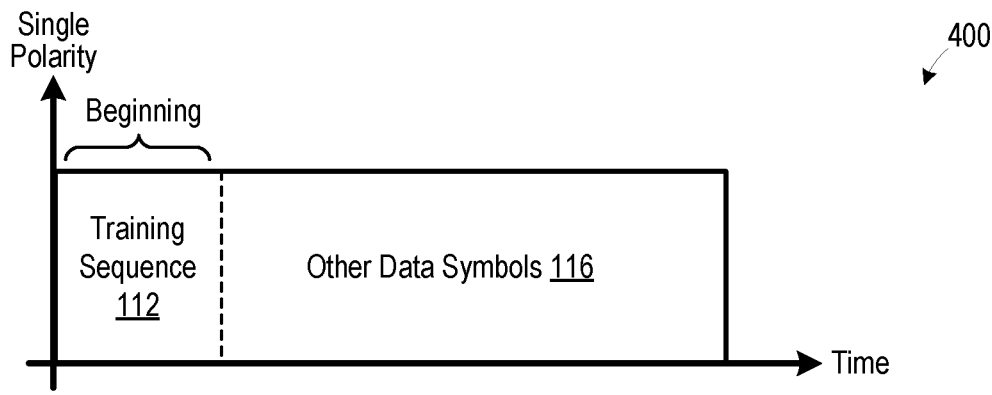
FIG. 4 is a block diagram of a single-polarity data frame including a training sequence, according to an embodiment.

Referring again to FIG. 1, pre-processing module 102 is further configured to insert training sequence 112 into each data frame 114, sometimes referred to as transmitter-side data frames 114, at a predetermined position of the data frame, such as a beginning, end, or midpoint of the data frame. Pre-processing module 102 is also configured to insert other data symbols 116 into each data frame 114. Other data symbols 116 include a payload 118 to be transmitted by communication system 100, and other data symbols 116 optionally include further data symbols (not shown), such as data symbols representing a destination address of data frame 114 and/or data symbols representing error checking information. FIG. 4 is a block diagram of a data frame 400, which is one possible embodiment of data frame 114. Data frame 400 is a single-polarity data frame and includes training sequence 112 inserted at the beginning of data frame 400, such that training sequence 112 indicates the data frame's beginning. Other data symbols 116 follow training sequence 112. The number of other data symbols 116 in data frame 400 is optionally fixed, such that all instances of data frame 400 have a common total number of data symbols.

Figure 5:
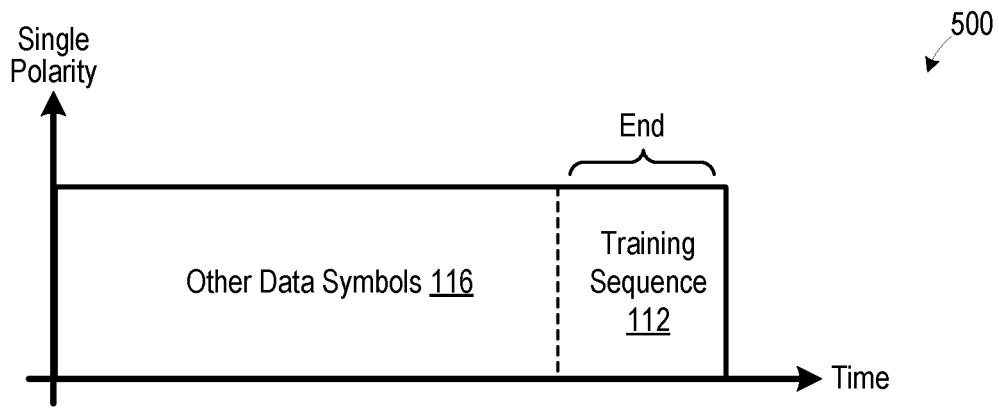
FIG. 5 is a block diagram another single-polarity data frame including a training sequence, according to an embodiment.

Data frame 400 could be modified so that training sequence 112 indicates a different position of the data frame. For example, FIG. 5 is a block diagram of data frame 500 which is an alternate embodiment of data frame 400 where training sequence 112 follows, instead of precedes, other data symbols 116. Consequentially, training sequence 112 indicates an end of data frame 500.

Figure 6:
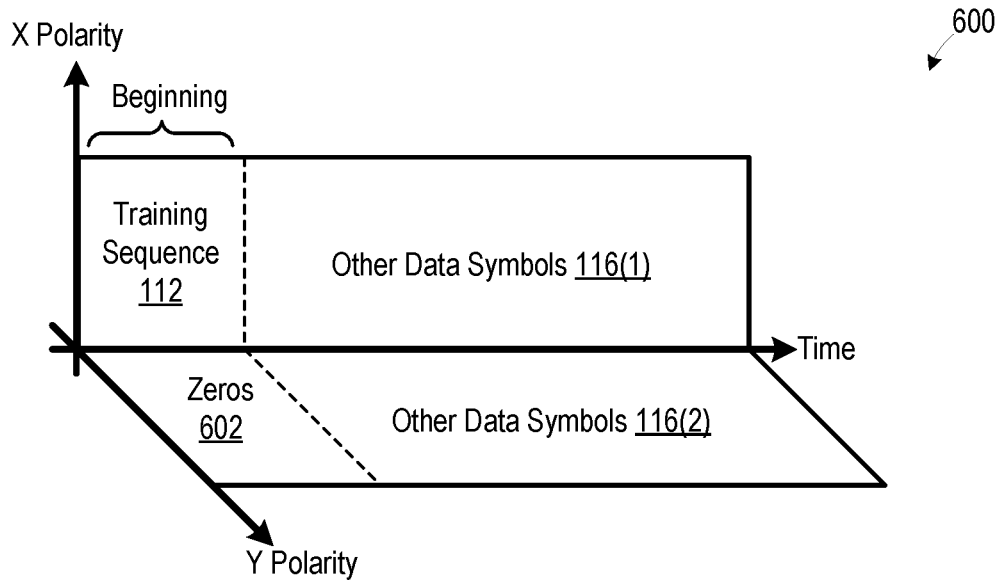
FIG. 6 is a block diagram of a dual-polarity data frame including a training sequence, according to an embodiment.

FIG. 6 is a block diagram of a data frame 600, which is a dual-polarity embodiment of data frame 114. Training sequence 112 precedes other data symbols 116(1) in an X-polarity of data frame 600, such that training sequence 112 indicates a beginning of data frame 600. Although training sequence 112 is present in only the X-polarity of data frame 600 at pre-processing module 102, training sequence 112 will be present in both the X and Y polarities at post-processing module 110 (discussed below). Therefore, it is unnecessary for training sequence 112 to be included in both polarities of data frame 600, and data frame 600 accordingly includes zeros 602, instead of a training sequence, preceding other data symbols 116(2). However, zeros 602 could be replaced with a training sequence or other data symbols without departing from the scope hereof. Additionally, while the two dimensions of data frame 600 respectively correspond to X and Y polarity, data frame 600 could be modified such that its dimensions correspond to orthogonal characteristics other than polarity.

Figure 7:
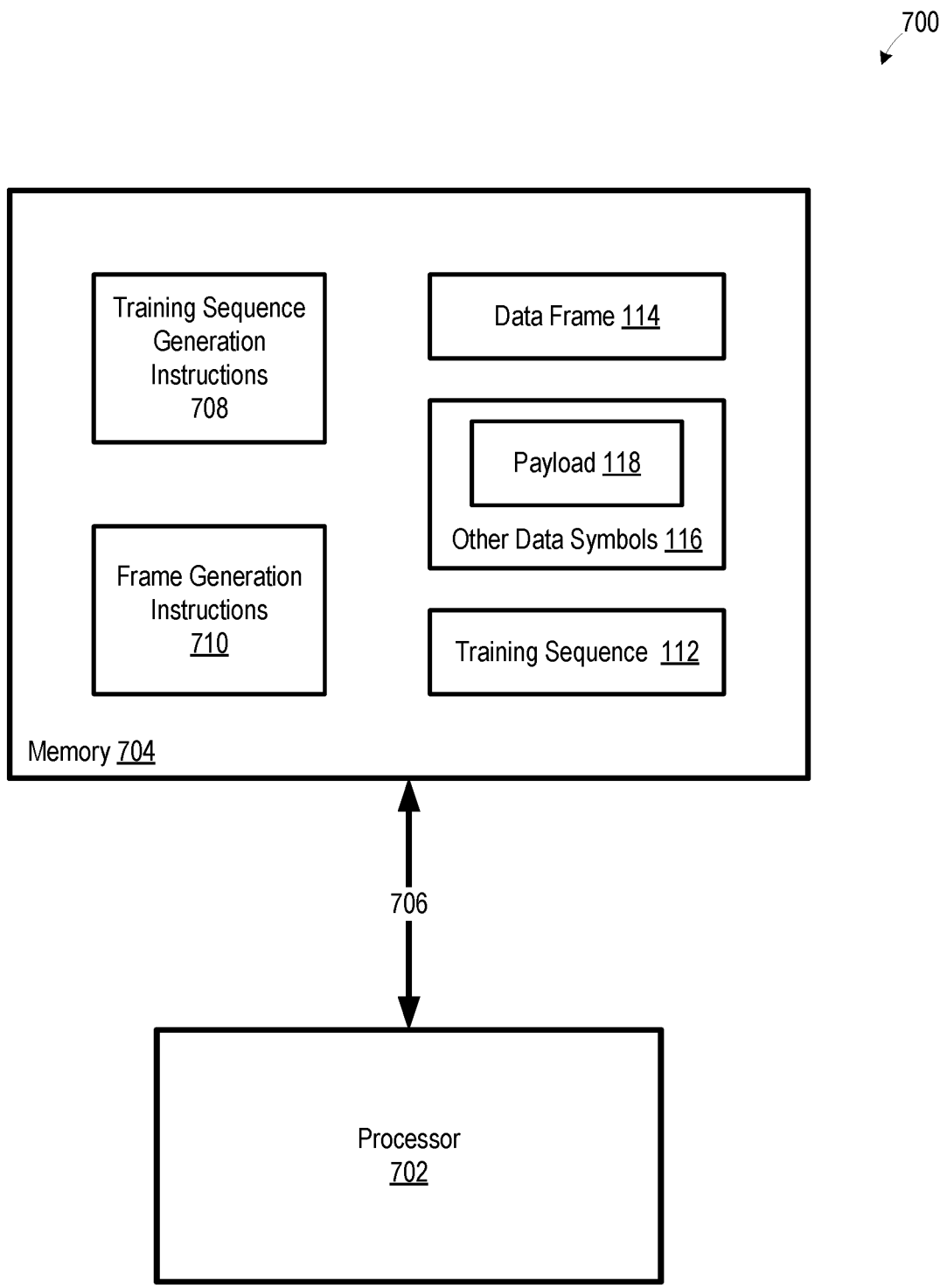
FIG. 7 is a block diagram of a pre-processing module, according to an embodiment.

FIG. 7 is a block diagram of pre-processing module 700, which is one possible embodiment of pre-processing module 102 of FIG. 1, although it is understood that pre-processing module 102 is not limited to the FIG. 7 embodiment. Pre-processing module 700 includes a processor 702, a memory 704, and communication bus 706 communicatively coupling processor 702 and memory 704. Memory 704 includes instructions 708 and 710, each of which is in the form of software and/or firmware. Memory 704 also holds a copy of each of training sequence 112, data frame 114, and other data symbols 116. Processor 702 is configured to execute instructions 708 to generate training sequence 112. In some embodiments, instructions 708 are configured such that training sequence 112 is static, i.e., training sequence 112 does not change during operation of communication system 100. In some other embodiments, instructions 708 are configured such that training sequence 112 is dynamic, e.g., such that training sequence 112 changes based on operating conditions of communication system 100. Processor 702 is further configured to execute instructions 710 to generate data frame 114 from training sequence 112 and other data symbols 116.

Referring again to FIG. 1, transmitter 104 is configured to receive constituent data symbols 120 of each data frame 114, and transmitter 104 is configured to convert data symbols 120 to communication signals 121. Transmitter 104 sends communication signals 121 to receiver 108 via communication medium 106. In some embodiments, communication medium 106 is an optical cable, an electrical cable, or a wireless communication link. Additionally, communication medium 106 could include two or more different communication mediums, connected in serial and/or parallel. For example, a first portion of communication medium 106 could be embodied by an optical cable, and a second portion of communication medium 106 could be embodied by a wireless communication link, where the first and second portions of communication medium 106 are communicatively coupled in series. As another example, communication medium 106 could be embodied by a plurality of optical cables communicatively coupled in parallel. As yet another example, a first portion of communication medium 106 could be embodied by an optical cable, a second portion of communication medium 106 could be embodied by a coaxial electrical cable, and a third portion of communication medium 106 could be embodied by a wireless communication link, where the first, second, and third portions of communication medium 106 are communicatively coupled in series. Discussed below with respect to FIGS. 8-13 are several example embodiments of communication system 100 with different implementations of communication medium 106. However, it is appreciated that communication medium 106 is not limited to these examples. Details of pre-processing module 102 and post processing module 110 are not shown in FIGS. 8-13 for illustrative clarity.

Figure 8:
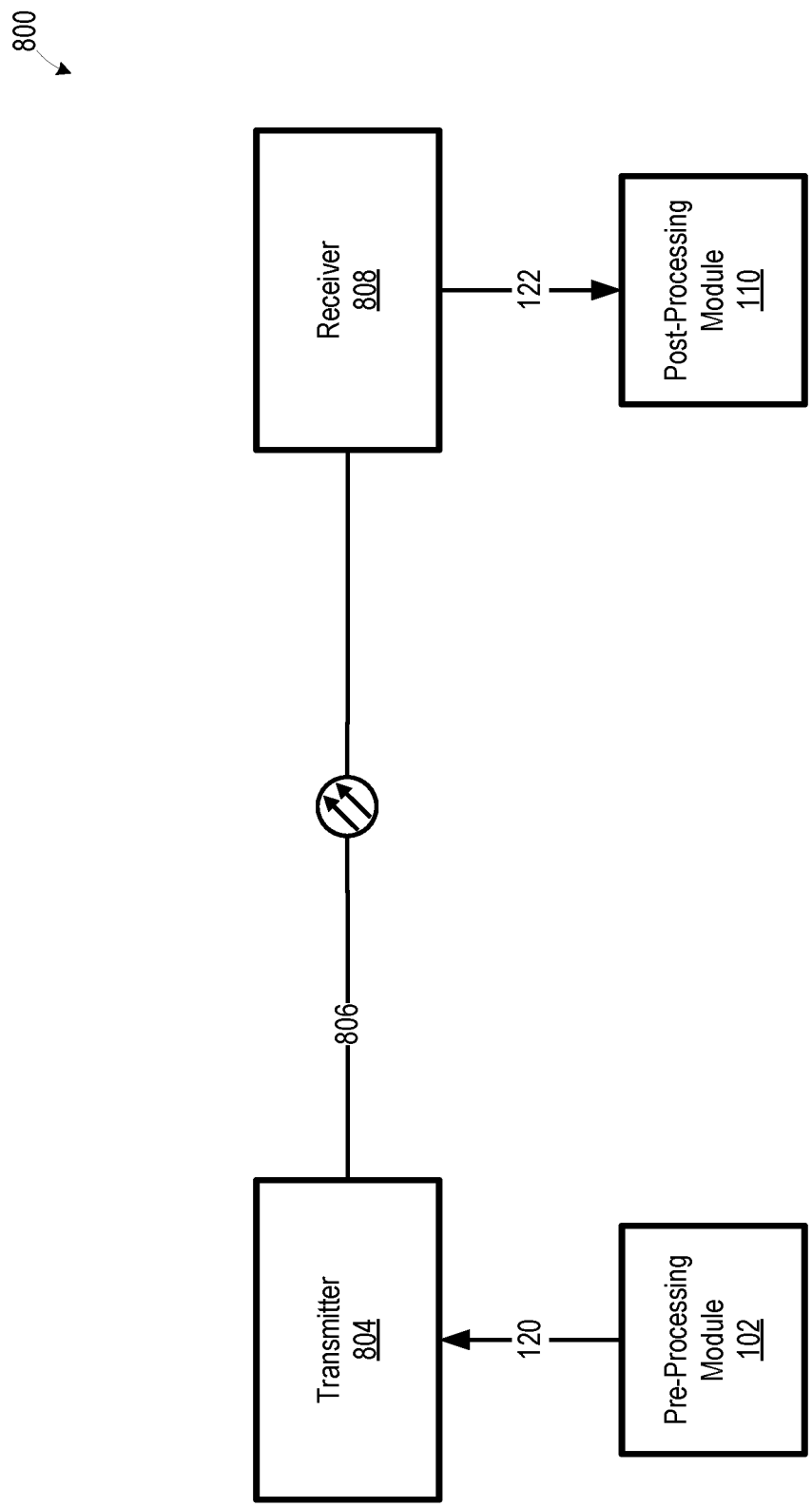
FIG. 8 is a block diagram of an embodiment of the FIG. 1 communication system where a communication medium is embodied by an optical cable.

FIG. 8 is a block diagram of a communication system 800, which is an embodiment of communication system 100 (FIG. 1) where communication medium 106 is embodied by an optical cable 806, transmitter 104 is embodied by an optical transmitter 804, and receiver 108 is embodied by an optical receiver 808, respectively. In some embodiments, communication system 800 is configured to implement either direct detect optical transmission or coherent optical transmission.

Figure 9:
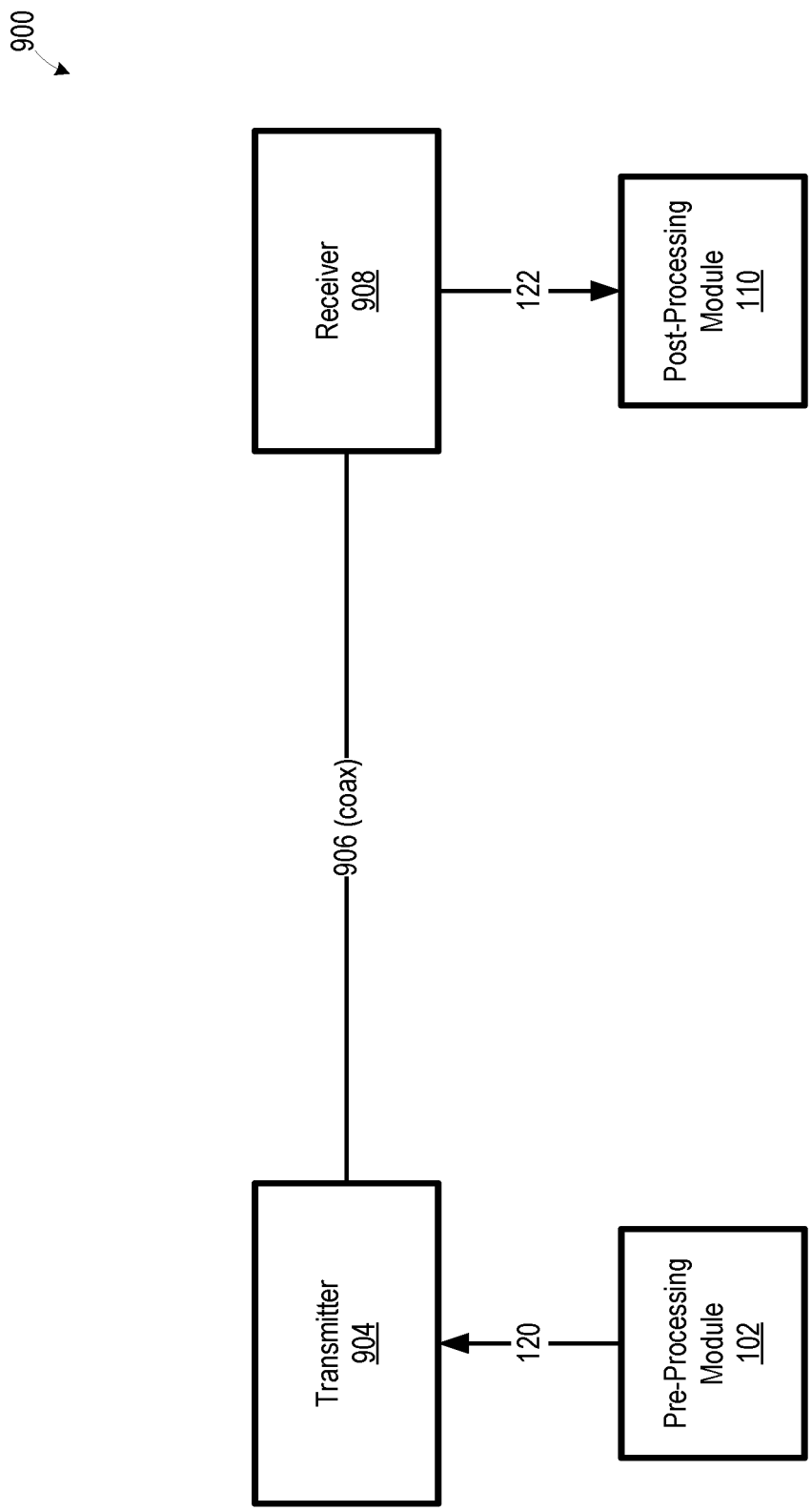
FIG. 9 is a block diagram of an embodiment of the FIG. 1 communication system where a communication medium is embodied by a coaxial electrical cable.

FIG. 9 is a block diagram of a communication system 900, which is an embodiment of communication system 100 (FIG. 1) where communication medium 106 is embodied by a coaxial electrical cable 906, transmitter 104 is embodied by a radio frequency transmitter 904, and receiver 108 is embodied by a radio frequency receiver 908, respectively. In some embodiments, communication system 900 is configured to operate according to a Data Over Cable Service Interface (DOCSIS) specification.

Figure 10:
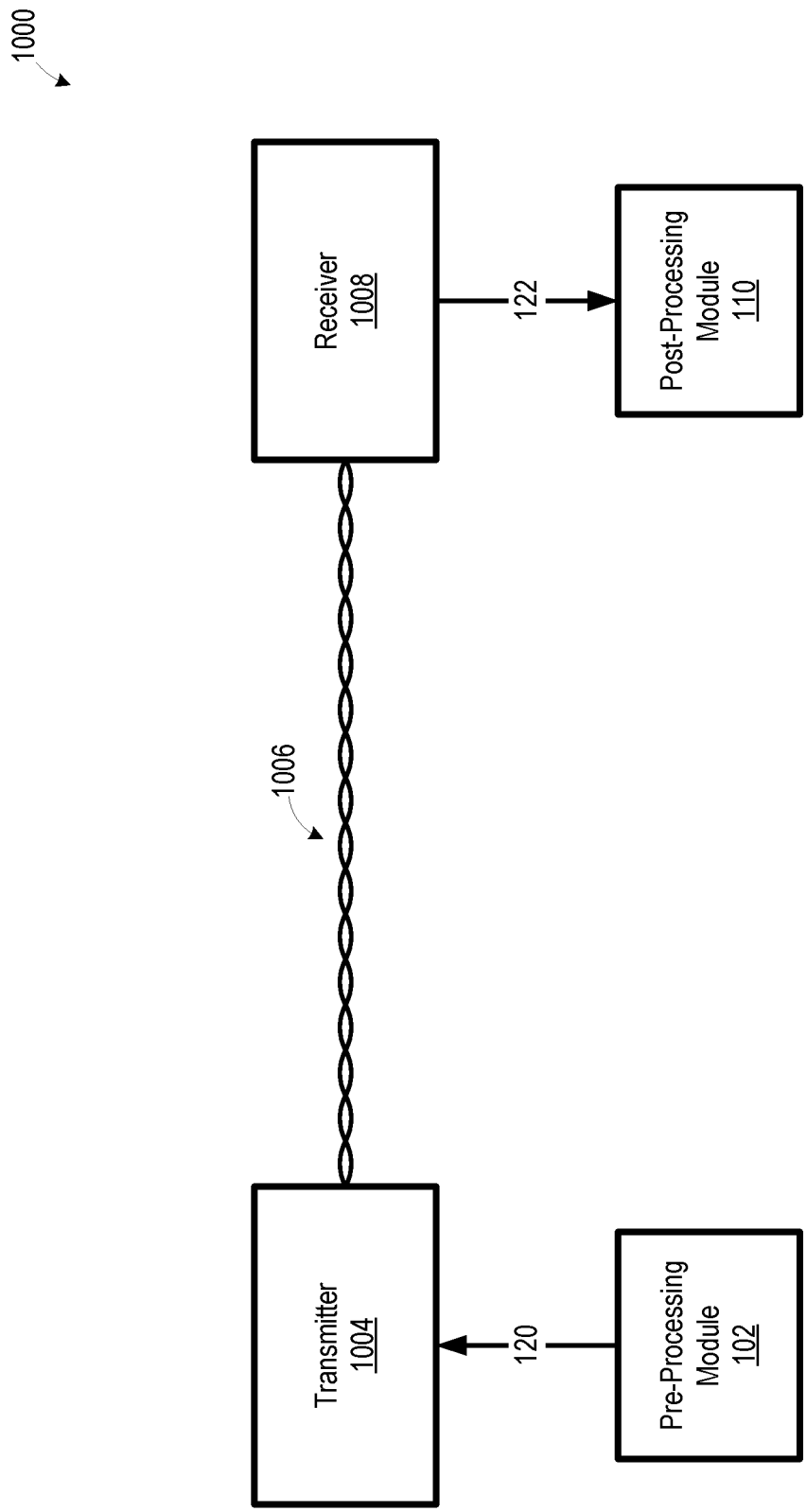
FIG. 10 is a block diagram of an embodiment of the FIG. 1 communication system where a communication medium is embodied by a twisted pair electrical cable.

FIG. 10 is a block diagram of a communication system 1000, which is an embodiment of communication system 100 (FIG. 1) where communication medium 106 is embodied by twisted pair electrical cable 1006, transmitter 104 is embodied by an electrical transmitter 1004, and receiver 108 is embodied by an electrical receiver 1008, respectively. Twisted pair cable 1006 includes two or more pairs of electrical wire. For example, in some embodiments, twisted pair electrical cable 1004 is a telephone electrical cable, an Ethernet electrical cable, or a Universal Serial Bus (USB) electrical cable.

Figure 11:
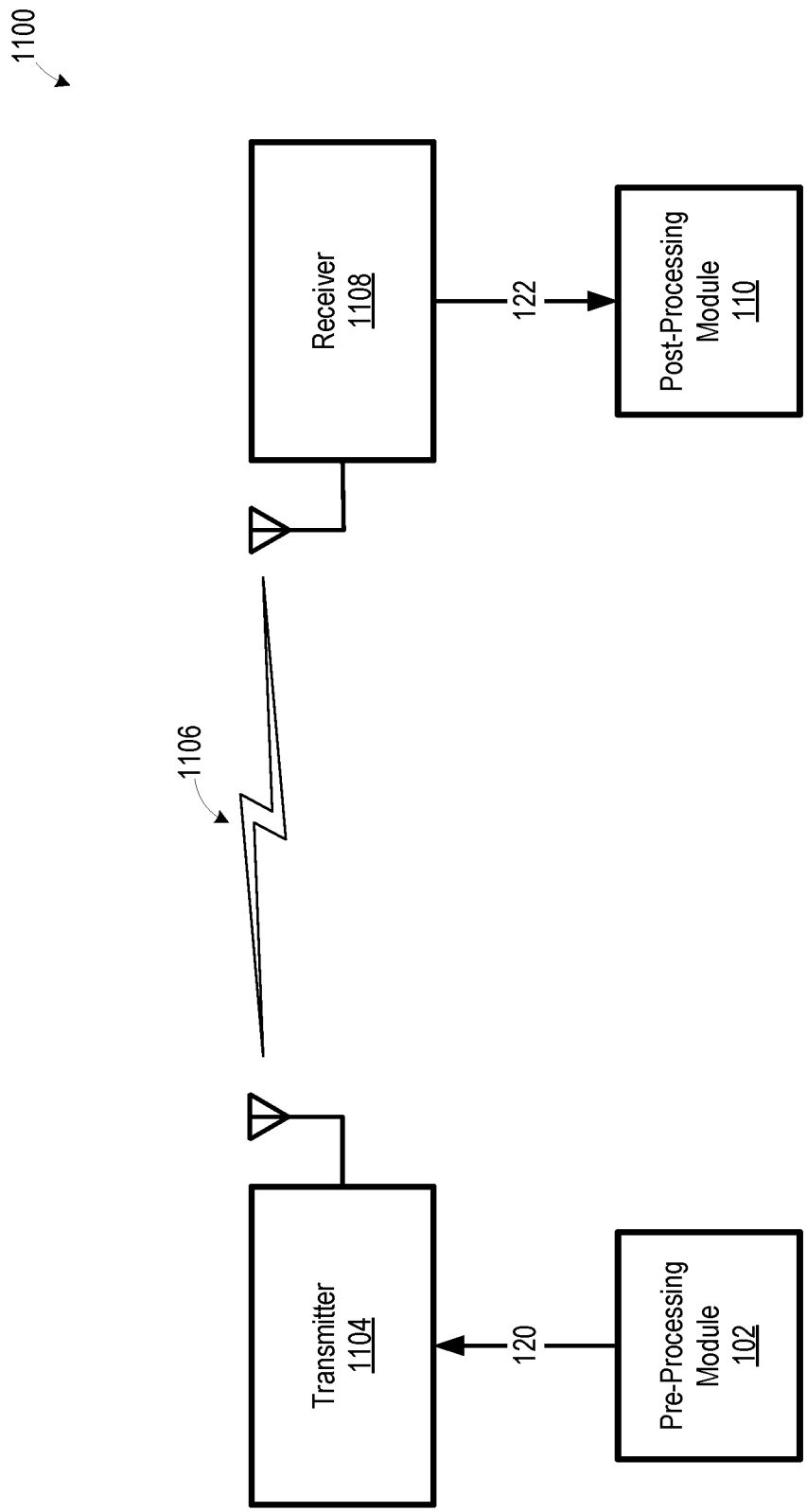
FIG. 11 is a block diagram of an embodiment of the FIG. 1 communication system where a communication medium is embodied by a wireless communication link.

FIG. 11 is a block diagram of a communication system 1100, which is an embodiment of communication system 100 (FIG. 1) where communication medium 106 is embodied by a wireless communication link, transmitter 104 is embodied by a wireless transmitter 1104, and receiver 108 is embodied by wireless receiver 1108, respectively. Data is sent from transmitter 1104 to receiver 1108 via wireless communication signals 1106, which are an embodiment of communication signals 121 of FIG. 1. Wireless communication signals 1106 are, for example, radio frequency signals or optical signals sent through free space. In some embodiments, transmitter 1104 includes a wireless base station, such as a wireless base station operating according to a cellular communication protocol (e.g., a Long Term Evolution (LTE) communication protocol, a 5G communication protocol, a 6G communication protocol), a WiFi communication protocol, a satellite communication protocol, a Bluetooth communication protocol, and/or a free space optical communication protocol. Additionally, in certain embodiments, receiver 1108 includes a mobile telephone, a computer, a set-top device, a data storage device, an Internet of Things (IoT) device, an entertainment device, a computer networking device, a smartwatch, a wearable device with wireless capability, a medical device, a security device, a monitoring device, and a wireless access device (including, for example, an eNB, a gNB, a Wi-Fi-based wireless access point, an IAB access point, a microcell, a picocell, a femtocell, a macrocell, a Wi-Fi-based application, a satellite communication device, etc).

Figure 12:
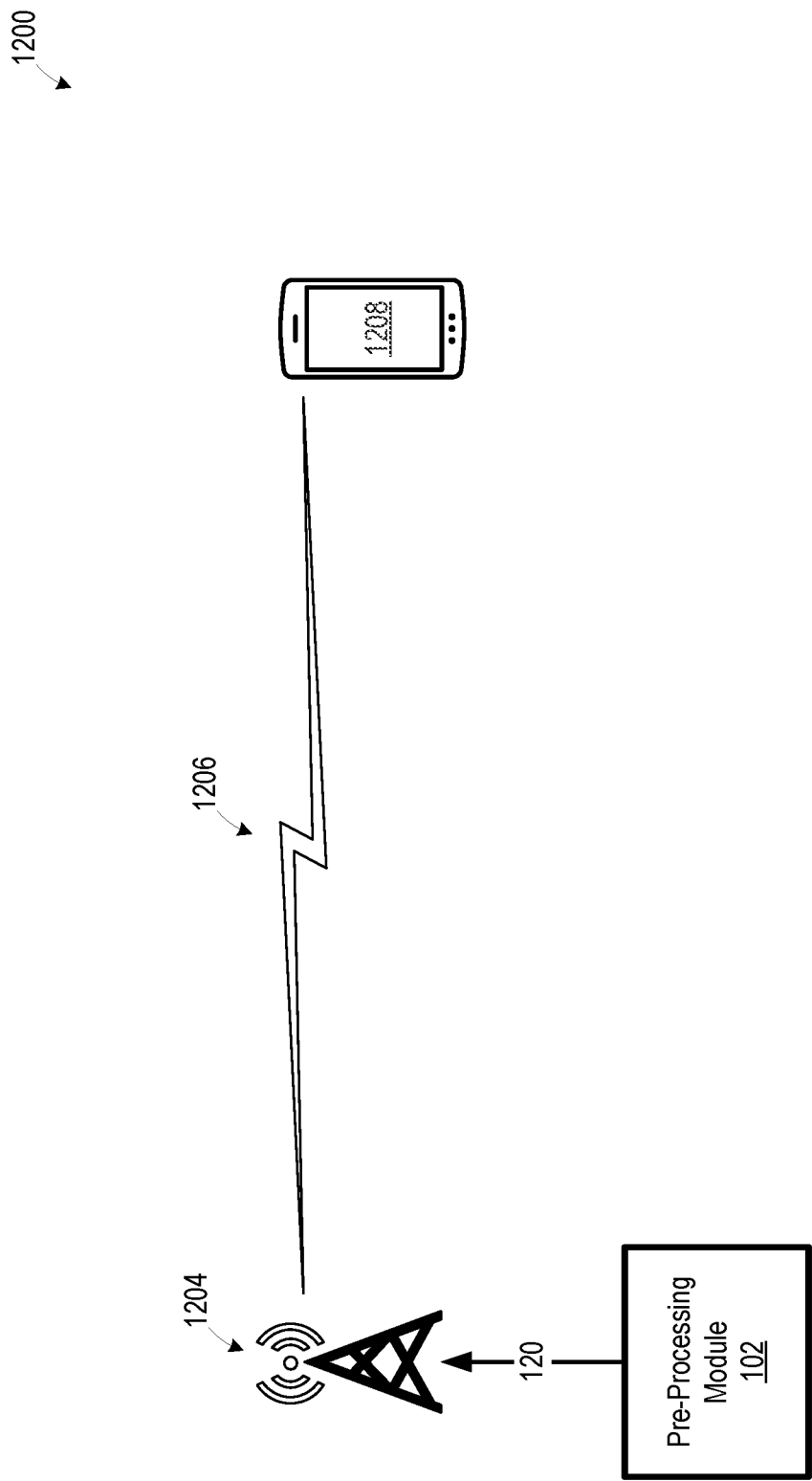
FIG. 12 is a block diagram of an embodiment of the FIG. 1 communication system where a communication medium is embodied by a cellular wireless communication link.

FIG. 12 is a block diagram of a communication system 1200, which is an embodiment of communication system 100 (FIG. 1) where communication medium 106 is embodied by a cellular wireless communication link, transmitter 104 is embodied by a cellular wireless transmitter 1204, and receiver 108 and post-processing module 110 are collectively embodied by a mobile telephone 1208. Data is sent from transmitter 1204 to mobile telephone 1208 via wireless communication signals 1206, which are embodiments of communication signals 121 of FIG. 1. Mobile telephone 1208 implements the functionality of post-processing module 110 (discussed below), as well as the functionality of receiver 108 (discussed below).

Figure 13:
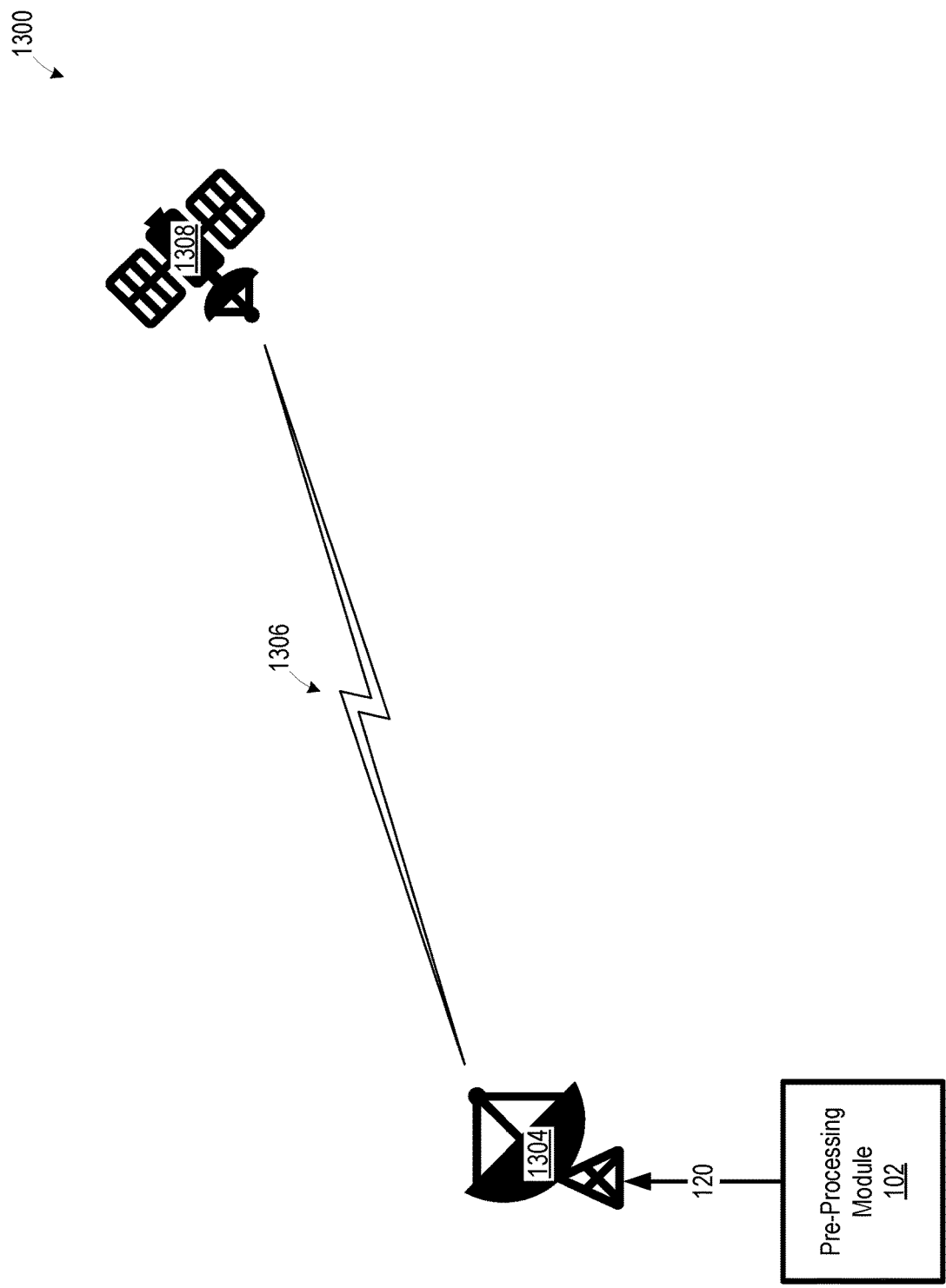
FIG. 13 is a block diagram of an embodiment of the FIG. 1 communication system where a communication medium is embodied by a satellite wireless communication link.

FIG. 13 is a block diagram of a communication system 1300, which is an embodiment of communication system 100 (FIG. 1) where communication medium 106 is embodied by a satellite communication link, transmitter 104 is embodied by a ground station 1304, and receiver 108 and post processing module 110 are collectively embodied by a satellite 1308. Data is sent from ground station 1304 to satellite 1308 via wireless communication signals 1306, which are embodiments of communication signals 121 of FIG. 1. Satellite 1308 is, for example, a low earth orbit (LEO) satellite, a medium each orbit (MEO) satellite, or a geostationary equatorial orbit (GEO) satellite. Satellite 1308 implements the functionality of post-processing module 110, as well as the functionality of receiver 108.

Referring again to FIG. 1, receiver 108 is configured to convert communication signals 121 to a stream of received data symbols 122, where each received data symbol 122 corresponds to a respective data symbol 120. Post-processing module 110 is configured to synchronize a received data frame 124 and received data symbols 122 by detecting presence of training sequence 112 in received data symbols 122, to thereby identify a data frame position 126. For example, consider a scenario where a transmitter-side data frame 114 includes training sequence 112 indicating a beginning of the data frame, such as illustrated in FIGS. 4 and 6. In this scenario, post-processing module 110 identifies a position 126 (the beginning) of received data frame 124 by detecting presence of training sequence 112 in received data symbols 122. As another example, consider a scenario where a transmitter-side data frame 114 includes training sequence 112 indicating an end of the data frame, such as illustrated in FIG. 5. In this scenario, post processing module 110 identifies position 126 (the end) of received data frame 124 by detecting a presence of training sequence 112 in received data symbols 122.

Post-processing module 110 is configured to associate received data symbols 122 with received data frame 124 according to identified data frame position 126. For example, assume that each data frame in communication system 100 includes M data symbols, and training sequence 112 indicates beginning of a data frame. Post processing module 110 may be configured to associate received data symbols 122 with received data frame 124 by (a) detecting the beginning of received data frame 124 and (b) associating the next M received data symbols 122 with received data frame 124. As another example, assume that each data frame in communication system 100 includes X data symbols, and training sequence 112 indicates end of a data frame. Post processing module 110 may be configured to associate received data symbols 122 with received data frame 124 by (a) detecting the end of received data frame 124 and (b) associating the previous X received data symbols 122 with received data frame 124. Post-processing module 110 is further configured to recover a payload 128 from received data frame 124, where payload 128 is equivalent to or related to payload 118, using techniques appropriate for the modulation format implemented by communication system 100.

Some embodiments of post-processing module 110 are configured to detect presence of training sequence 112 in received data symbols 122 by detecting a peak in an autocorrelation value of two sliding windows samples of received data symbols 122. The two sliding window samples are sequential in time, and each sliding window sample has the same length L (N symbols) as each of sets 202 and 204 (FIGS. 2 and 3). The autocorrelation function of the two sliding window samples will have a peak value when the each sliding window sample is fully aligned with a respective one of the two sets 202 and 204, thereby indicating presence of training sequence 112 in received data symbols 116 within the sliding window samples.

For example, consider FIG. 14, which is a block diagram of sliding window samples 1402 and 1404 of received data symbols 122, at a point time before training sequence 112 is completely within these two sliding window samples. At this point in time, respective parts of each of first and second sets 202 and 204 of data symbols $T_s$ are within first sliding winding sample 1402. Additionally, only part of second set 204 of data symbols $T_s$ is within second sliding window sample 1404. Consequently, an autocorrelation value of (a) received data symbols 122 within first sliding window sample 1402 and (b) received data symbols 122 within second sliding window sample 1404 will not be at its maximum possible value.

Now consider FIG. 15, which is a block diagram of sliding window samples 1402 and 1404 of received data symbols 122, at a point time when training sequence 112 is completely within these two window samples. At this point in time, first set 202 of data symbols $T_s$ is completely within first sliding winding sample 1402, and second set 204 of data symbols $T_s$ is completely within sliding second sliding window sample 1404. Consequently, an autocorrelation value of (a) received data symbols 122 within first sliding window sample 1402 and (b) received data symbols 122 within second sliding window 1404 will be at its peak value, indicating detection of training sequence 112.

In embodiments where receiver 108 receives communication signals 121 in multiple dimensions, such as in multiple polarities, post-processing module 110 may be configured to determine an autocorrelation value for each dimension and sum all of determined autocorrelation values to generate a combined autocorrelation value. The respective autocorrelation values for each dimension are optionally individually weighted in the combined autocorrelation value, such as based on power of a received signal associated with the dimension.

Some other embodiments of post-processing module 110 are configured to detect presence of training sequence 112 in received data symbols 122 by detecting a peak in a cross-correlation value of (a) a single sliding window sample of received data symbols 122 and (b) a copy of training sequence 112. In these embodiments, the single sliding window sample of received data symbols 122 has the same length as training sequence 112, i.e., a length of 2N data symbols.

Figure 16:
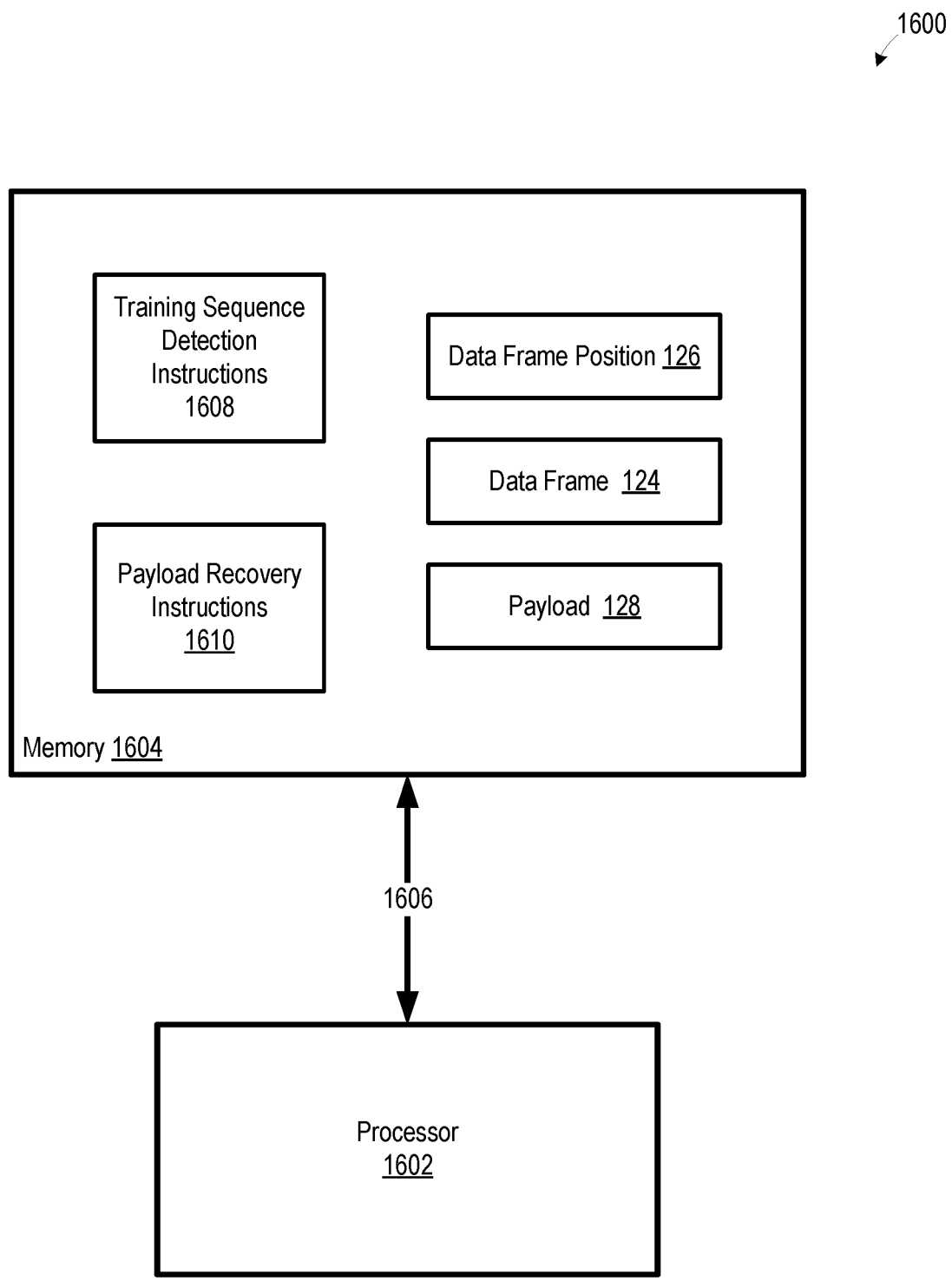
FIG. 16 is a block diagram of a post-processing module, according to an embodiment.

FIG. 16 is a block diagram of a post-processing module 1600, which is one possible embodiment of post-processing module 110 of FIG. 1, although it is understood that post-processing module 110 is not limited to the FIG. 16 embodiment. Post-processing module 1600 includes a processor 1602, a memory 1604, and communication bus 1606 communicatively coupling processor 1602 and memory 1604. Memory 1604 includes instructions 1608 and 1610, each of which is in the form of software and/or firmware. Memory 1604 also holds a copy of each of data frame position 126, received data frame 124, and payload 128. Processor 1602 is configured to execute instructions 1608 to detect training sequence 112, such as by detecting a peak autocorrelation value or a peak cross-correlation value. Processor 702 is further configured to execute instructions 1610 to recover a payload 128 from received data frame 124, such as by using techniques appropriate for the modulation format implemented by communication system 100.

Discussed below are examples of how post-processing module 110 may be configured to determine an autocorrelation value of two sliding window samples, such as sliding window samples 1402 and 1404 of FIGS. 14 and 15. However, post-processing module 110 may be configured to determine an autocorrelation value of two sliding window samples using other methods without departing from the scope hereof.

Examples of Determining Autocorrelation

Assuming $t_s$ is signal baud rate and transmitted signals are represented as $T(mt_s)$, then received signals $r(mt_s)$ can be expressed by EQN. 2 below, where $\Delta f$ is frequency-offset between local oscillator signals (LO) and received signals, m is a received signal index number, and $\varphi$ is the phase difference between LO signals and received signals. Channel noise and phase noise are not considered in this example, for simplicity without loss of generality.

$$r(mt_s)=T(mt_s)\exp(j2\pi\Delta f(mt_s)+\varphi) \quad \text{(EQN. 2)}$$

For a single polarization receiver without polarization diversity detection, the auto-correlation calculation can be applied according to EQNS. 3 and 4 below:

$$P(m)=\Sigma_{k=0}^{N-1}r[(m+k)t_s]r[(m+2N-k-1)t_s] \quad \text{(EQN. 3)}$$

In EQN. 3, P(m) is an absolute auto-correlation function. In some case, such as under favorable data transmission conditions, the peak value of the auto-correlation function may be sufficiently detectible solely from P(m). However, in some other cases, such as under less favorable data transmission conditions, it may be desirable to use a higher order autocorrelation function to achieve improve autocorrelation performance, with the tradeoff of increased computational complexity. For example, EQN. 4 below is a Q-th order normalized auto-correlation function that may be implemented by post-processing module 110:

$$N(m,Q)=\{|P(m)/\Sigma_{k=0}^{N-1}|r[(m+k)t_s]||r[(m+2N-k-1)t_s]|\}Q \quad \text{(EQN. 4)}$$

In EQN. 4, Q is the order of the auto-correlation function, and Q is a positive integer that is greater than or equal to one. The larger the value of Q, the higher correlation peak-to-noise ratio, but the higher computation complexity. When Q is equal to one, the autocorrelation function is a first order normalized autocorrelation function.

Although the training sequence may be inserted in only one polarization of a polarization diverse communication system, such as discussed above with respect to FIG. 6, the training sequence will nevertheless be detected in two polarizations at the receiver. Power of the detected training sequence will vary because detected signal polarization varies as a function of time. Therefore, some embodiments of post-processing module 110 combine auto-correlation values from two different polarizations (or from two other orthogonal dimensions) to help achieve robust training sequence detection even as detected signal polarization varies.

For example, assume that received signals of two different polarizations are $r_x(mt_s)$ and $r_y(mt_s)$, respectively. Post-processing module 110 may be configured to combine respective weighted normalized autocorrelation functions for each of the two polarizations to yield a combined normalized autocorrelation function $N_C(m,Q)$, such as expressed below in EQNS. 5-9. The respective weight given to each autocorrelation function is, for example, a function of received signal power of the corresponding polarization, such as given by EQNS. 8 and 9.

$$N_C(m,Q)=W_x N_x(m,Q)+W_y N_y(m,Q) \quad \text{(EQN. 5)}$$

$$N_x(m,Q)=\{|\Sigma_{k=0}^{N-1}r_x[(m+k)t_s]r_x[(m+2N-k-1)t_s]|/\Sigma_{k=0}^{N-1}|r_x[(m+k)t_s]||r_x[(m+2N-k-1)t_s]|\}Q \quad \text{(EQN. 6)}$$

$$N_y(m,Q)=\{|\Sigma_{k=0}^{N-1}r_y[(m+k)t_s]r_y[(m+2N-k-1)t_s]|/\Sigma_{k=0}^{N-1}|r_y[(m+k)t_s]||r_y[(m+2N-k-1)t_s]|\}Q \quad \text{(EQN. 7)}$$

$$W_x=\Sigma_{k=0}^{2N-1}|r_x[(m+k)t_s]|^2/\Sigma_{k=0}^{2N-1}|r_x[(m+k)t_s]|^2+\Sigma_{k=0}^{2N-1}|r_y[(m+k)t_s]|^2 \quad \text{(EQN. 8)}$$

$$W_y=\Sigma_{k=0}^{2N-1}|r_y[(m+k)t_s]|^2/\Sigma_{k=0}^{2N-1}|r_x[(m+k)t_s]|^2\Sigma_{k=0}^{2N-1}|r_y[(m+k)t_s]|^2 \quad \text{(EQN. 9)}$$

Example Simulation Results

Discussed below with respect to FIGS. 17-23 are simulation results of several embodiments of communication system 100 implementing 25 Gigabaud (GBaud) dual-polarization quadrature phase shift keying (QPSK) with coherent optical data transmission. It is appreciated, though, that communication system 100 need not necessarily perform as indicated in these simulation results. To the contrary, performance of communication system 100 will vary depending on the specific configuration and operating conditions of the communication system.

FIGS. 17A-17C illustrate simulated autocorrelation values of an embodiment of communication system 100 where (a) training sequence 112 length is 256 data symbols, (b) a ratio of X and Y polarization received signal power is 0.25 to 0.75, (c) autocorrelation values are determined according to EQNS. 5-9 above where Q is equal to one, and (d)

transmission laser linewidth is set to 100 Kilohertz (KHz). FIG. 17A illustrates X polarization autocorrelation values, FIG. 17B illustrates Y polarization autocorrelation values, and FIG. 17C illustrates combined X and Y polarization autocorrelation values. A peak autocorrelation value, corresponding to presence of training sequence 112, is readily detectable in each of FIGS. 17A and 17B, although peak to maximum noise ratio (PMNR) is greater in the combined autocorrelation values of FIG. 17C than in the individual autocorrelation values of FIGS. 17A and 17B. PMNR is a ratio of the peak autocorrelation value to maximum background noise value.

FIGS. 18A-18C illustrate simulated autocorrelation values of an embodiment of communication system 100 under the same conditions as in FIGS. 17A-17C, but with a ratio of X and Y polarization received signal power of 0.99 to 0.01, instead of 0.75 to 0.25. FIG. 18A illustrates X polarization autocorrelation values, FIG. 18B illustrates Y polarization autocorrelation values, and FIG. 18C illustrates combined X and Y polarization autocorrelation values. While PMNR is relatively large in the X polarization, as illustrated in FIG. 18A, PMNR is small in the Y polarization, as illustration in FIG. 18B. However, combined PMNR of the X and Y polarizations is large, as illustrated in FIG. 18C. Accordingly, combining X and Y polarization autocorrelation values may advantageously compensate for a small PMNR value of an individual polarization.

Figure 19:
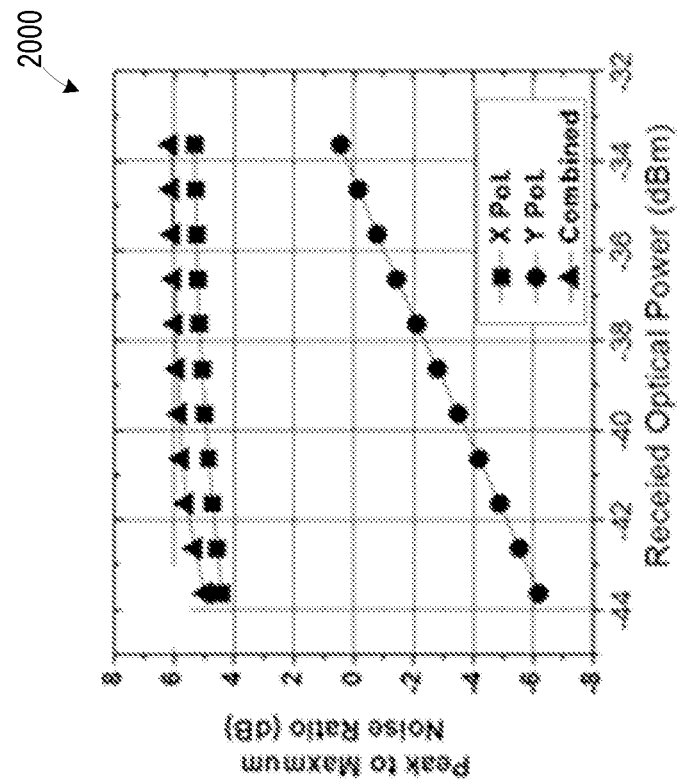
FIG. 19 is a graph of simulated peak to maximum noise ratio versus received optical power in an embodiment of the FIG. 1 communication system.
Figure 20:
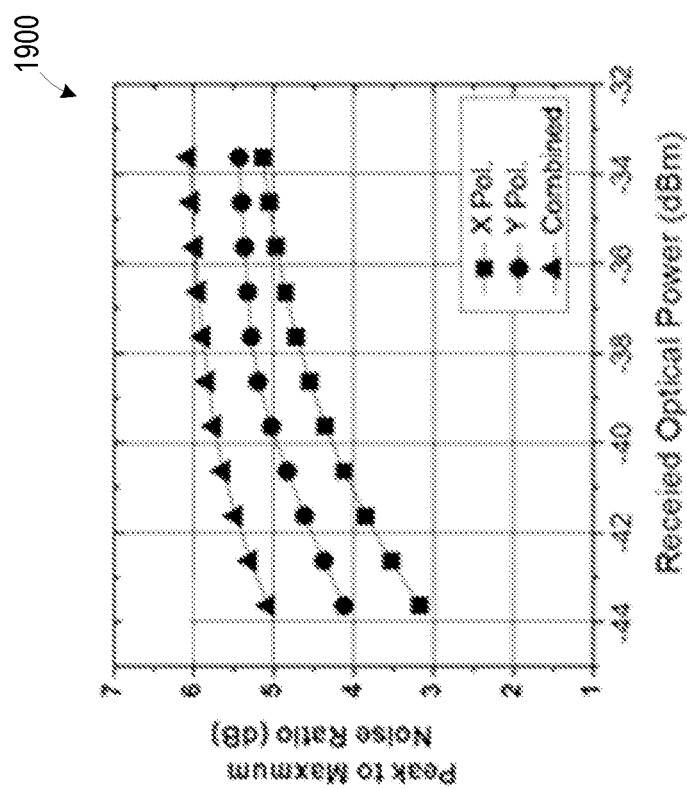
FIG. 20 is a graph of simulated peak to maximum noise ratio versus received optical power in another embodiment of the FIG. 1 communication system.

FIGS. 19 and 20 also illustrate potential gains in PMNR that can be achieved by combining X and Y polarization autocorrelation values. FIG. 19 is a graph 1900 of simulated PMNR as a function of received optical power when a ratio of X and Y polarization received signal power is 0.75 to 0.25, and FIG. 20 is a graph 2000 of simulated PMNR as a function of received optical power when a ratio of X and Y polarization received signal power is 0.99 to 0.01. Each graph includes a curve of PMNR versus received optical power for the X polarization, the Y polarization, and combined X and Y polarizations. As evident from FIGS. 19 and 20, significant gains in PMNR can be achieved by combining autocorrelation values of the X and Y polarizations, especially at low received power levels.

Figure 21:
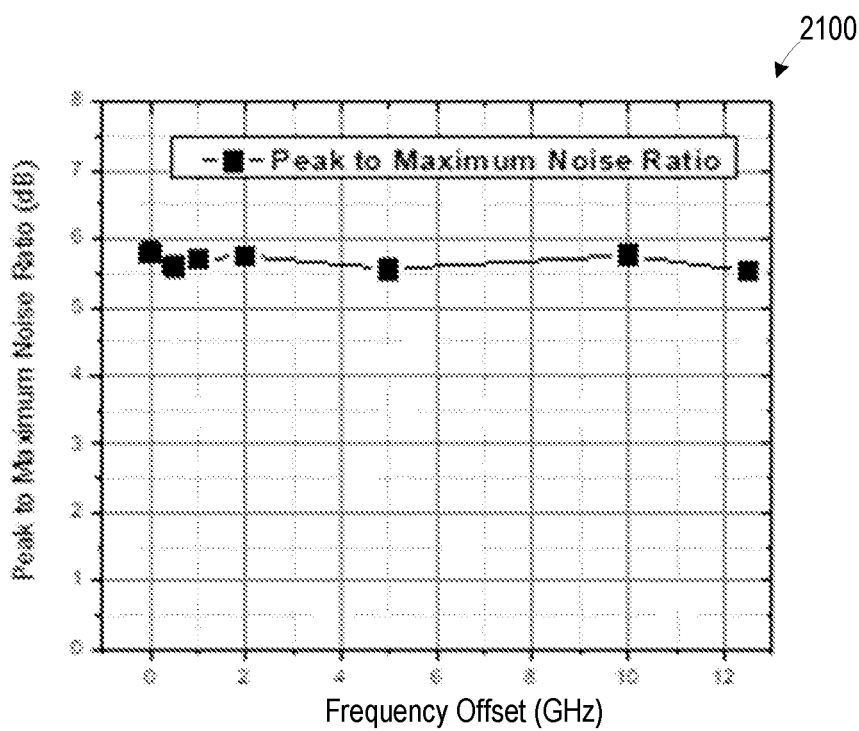
FIG. 21 is a graph of simulated peak to maximum noise ratio versus local oscillator frequency offset in an embodiment of the FIG. 1 communication system.

FIG. 21 is a graph 2100 of simulated PMNR as a function LO frequency offset of an embodiment of communication system 100 where post-processing module 110 is configured to detect presence of training sequence 112. PMNR varies little with change in LO frequency offset, showing that this embodiment is robust to large LO frequency offset.

Figure 22:
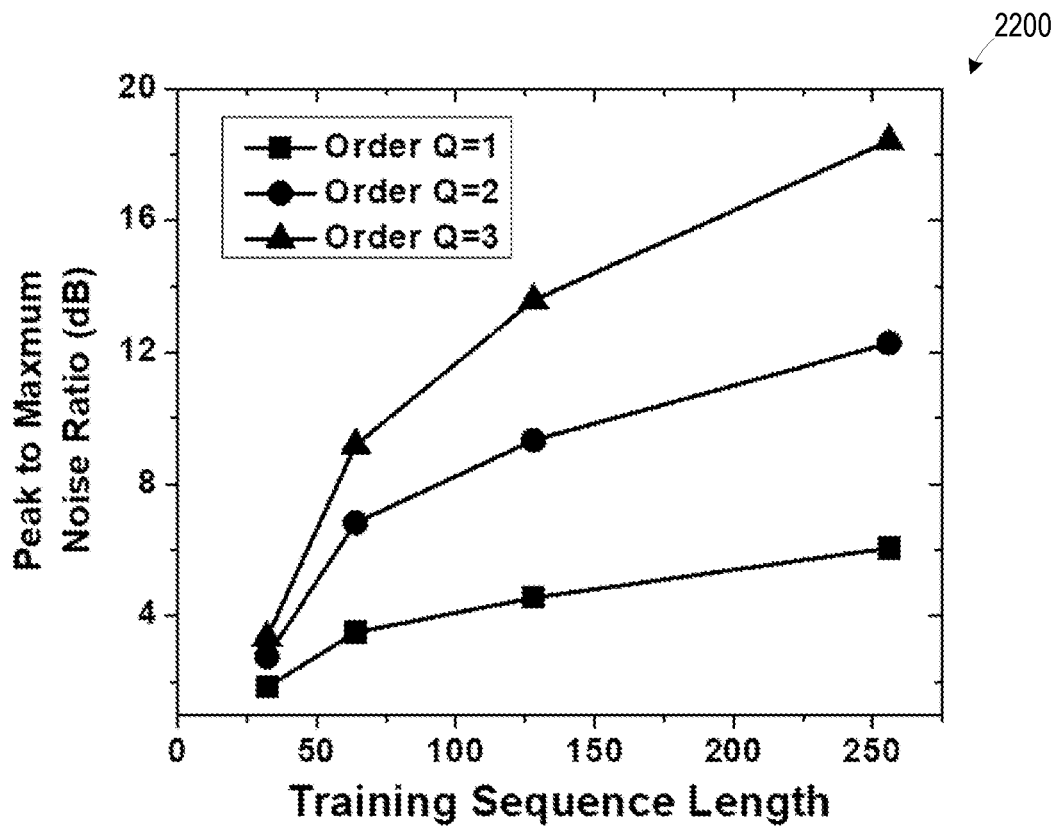
FIG. 22 is a graph of simulated peak to maximum noise ratio versus training sequence length in an embodiment of the FIG. 1 communication system.

FIG. 22 is a graph 2200 of simulated PMNR as a function training sequence 112 length at several different values of Q, in an embodiment of post processing module 110 configured to determine a combined autocorrelation value using EQNS. 5-9 above. FIG. 22 illustrates that PMNR can be significantly increased by increasing training sequence length and/or by increasing Q, when executing EQNS. 5-9 above.

Figure 23:
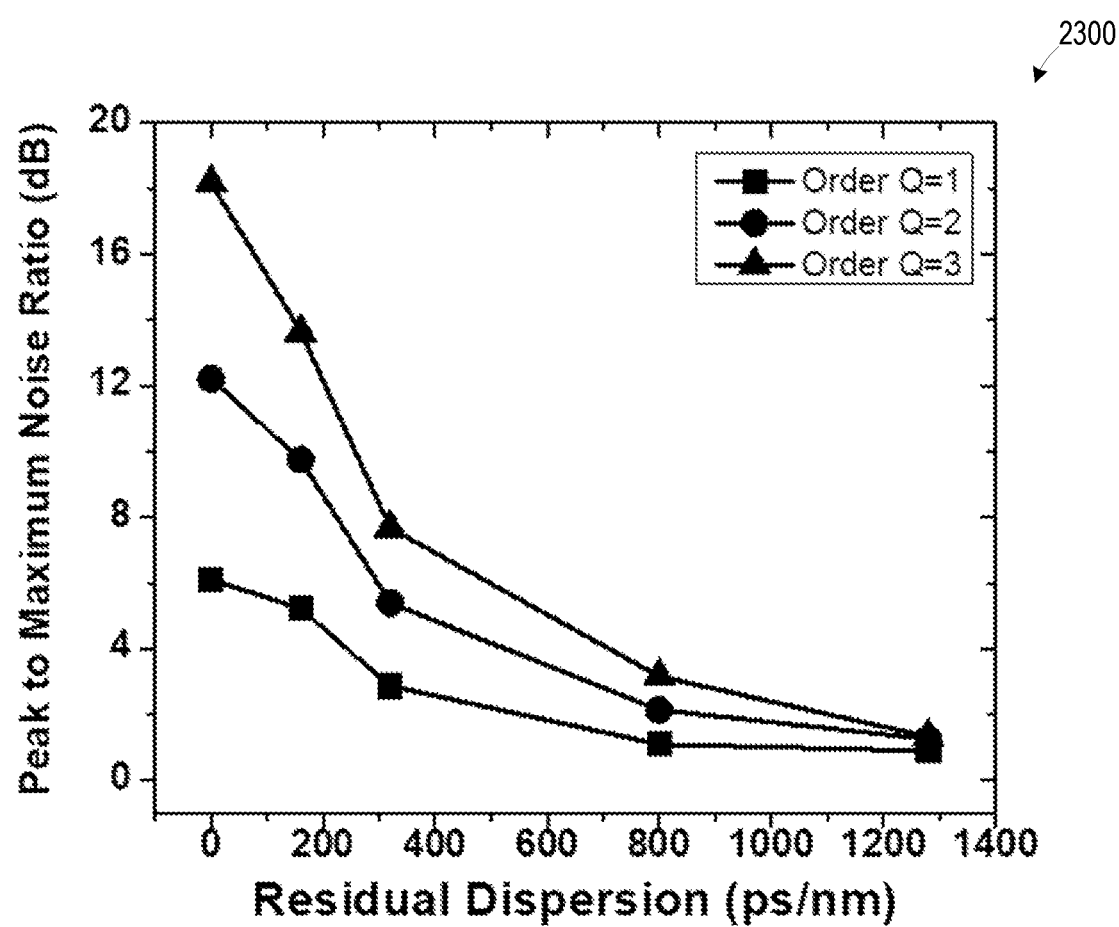
FIG. 23 is a graph of simulated peak to maximum noise ratio versus residual dispersion in an embodiment of the FIG. 1 communication system.

FIG. 23 is a graph 2300 of simulated PMNR as a function of residual dispersion in communication medium 106 at several different values of Q, of an embodiment of post processing module 110 configured to determine a combined autocorrelation value using EQNS. 5-9 above. The simulation of FIG. 23 assumes that received optical power remains constant at −33.6 dBm. FIG. 23 illustrates that while PMNR decreases with increasing residual dispersion, relatively large PMNR can nevertheless be realized, especially when Q is greater than one.

Additional Examples

Figure 24:
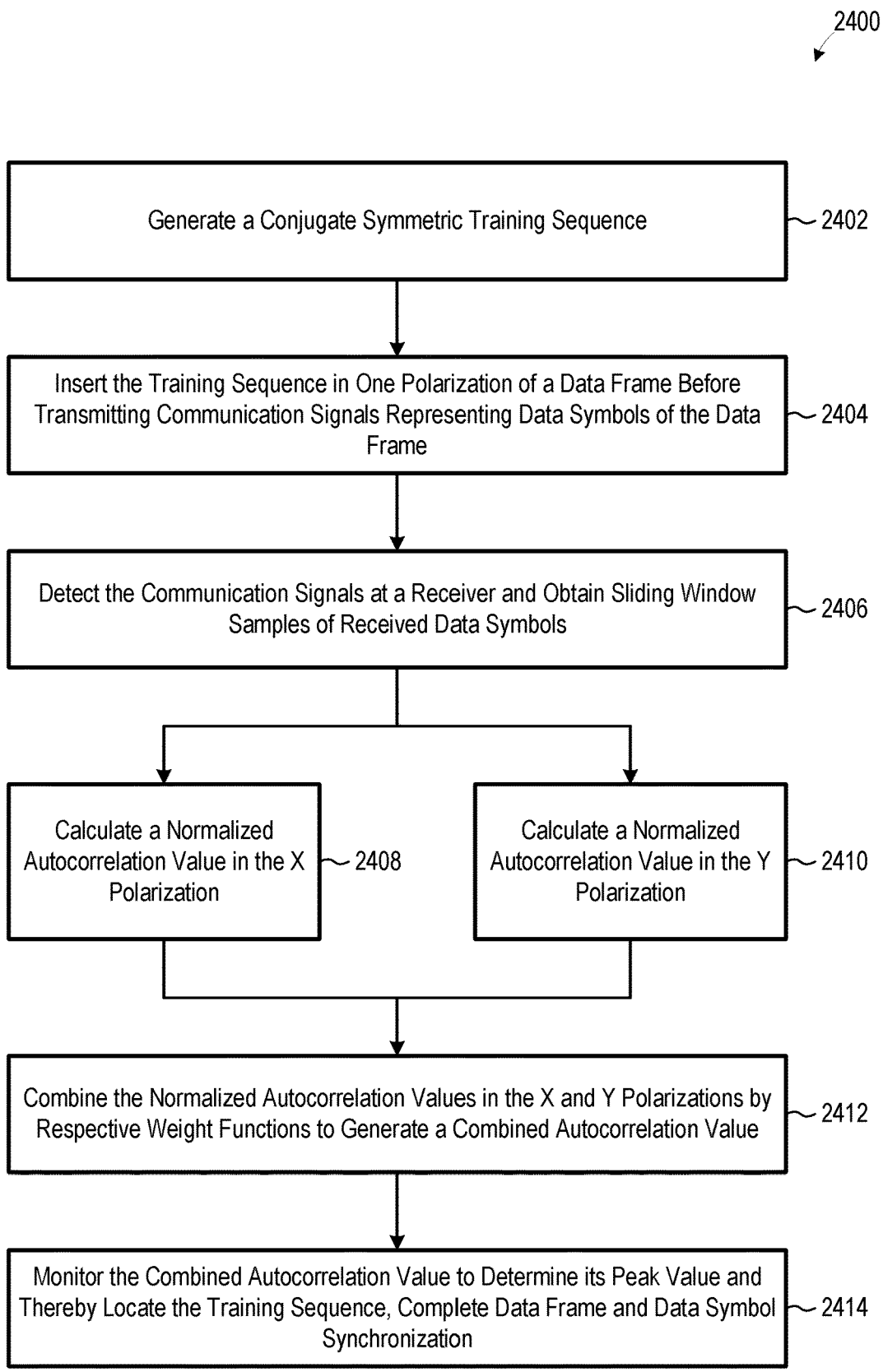
FIG. 24 is a flow chart of a method for synchronizing a data frame and data symbols in a communication system, according to an embodiment.
Figure 25:
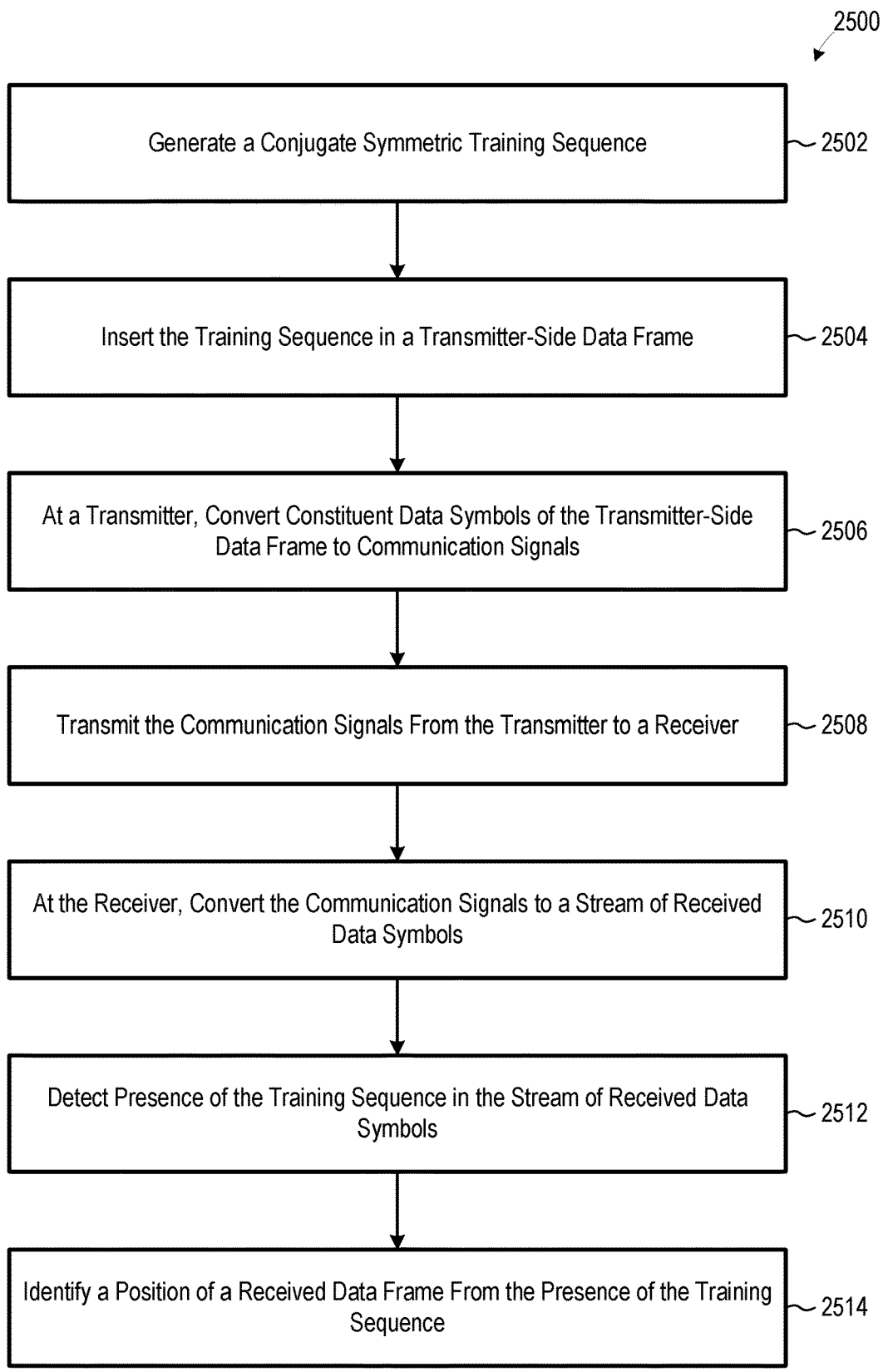
FIG. 25 is a flow chart of another method for synchronizing a data frame and data symbols in a communication system, according to an embodiment.

Discussed below with respect to FIGS. 24 and 25 are additional examples of the new systems and methods for data frame and data symbol synchronization. While the examples of FIGS. 24 and 25 are discussed with respect to communication system 100, these examples are not limited to this communication system. Additionally, communication system 100 is not limited to operating according to the examples of FIGS. 24 and 25.

FIG. 24 is a flow chart of a method 2400 for synchronizing a data frame and data symbols in a communication system. In a block 2402 of method 2400, a conjugate symmetric training sequence is generated. In one example of block 2402, pre-processing module 102 generates training sequence 112, such as having a form illustrated in FIG. 2 or 3. In a block 2404 of method 2400, the training sequence is inserted in one polarization of a data frame, before transmitting communication signals representing data symbols of the data frame from a transmitter to a receiver. In one example of block 2404, pre-processing module 102 inserts training sequence 112 in an X polarization of data frame 600, as illustrated in FIG. 6. In a block 2406 of method 2400, the communication signals are detected at the receiver and thereby converted into received data symbols, and two sliding window samples are obtained of the received data symbols. In one example of block 2406, receiver 108 converts communication signals 121 to received data symbols 122, and post-processing module 110 obtains sliding window samples 1402 and 1404 of received data symbols 122.

In a block 2408 of method 2400, a normalized autocorrelation value in the X polarization is calculated from the sliding window samples, and in a block 2410 of method 2400, a normalized autocorrelation value in the Y polarization is calculated from the sliding window samples. In one example of blocks 2408 and 2410, post-processing module 110 executes EQNS. 6 and 7, respectively, using the data of sliding window samples 1402 and 1404, as well as analogous sliding window samples in an additional dimension. In a block 2412 of method 2400, the normalized autocorrelation values in the X and Y polarizations are combined by respective weight functions to generate a combined autocorrelation value. In one example of block 2412, post-processing module 110 executes EQNS. 5, 8, and 9. In a block 2414 of method 2400, the combined autocorrelation value is monitored to determine its peak value and thereby locate the training sequence, and data frame and data symbol synchronization is completed. In one example of block 2414, post-processing module 110 locates training sequence 112 by detecting a peak value of the combined autocorrelation value determined by EQN. 5, and post-processing module 110 associates received data symbols 122 with data frame 124 based on detected position 126 of training sequence 112.

FIG. 25 is a flow chart of a method 2500 for synchronizing a data frame and data symbols in a communication system. In a block 2502 of method 2500, a training sequence including a serial sequence of data symbols that are conjugate symmetric is generated. In one example of block 2502, pre-processing module 102 generates training sequence 112, such as having a form illustrated in FIG. 2 or 3. In a block 2504 of method 2500, the training sequence is inserted in a transmitter-side data frame. In one example of block 2504, pre-processing module 110 inserts training sequence 112 in data frame 114. In a block 2506 of method 2500, constituent data symbols of the transmitter-side data frame are converted to communication signals, at a transmitter of the communication system. In one example of block 2506, transmitter 104 converts data symbols 120 to communication signals 121. In a block 2508 of method 2500, the communication signals are transmitted from the transmitter to a receiver of the communication system. In one example of method 2500, communication medium 106 transmits communication signals 121 from transmitter 104 to receiver 108.

In a block 2510 of method 2500, the communication signals are converted to a stream of received data symbols, at the receiver. In one example of block 2510, receiver 108 converts communication signals 121 to received data symbols 122. In a block 2512 of method 2500, presence of the training sequence is detected in the stream of received data symbols. In one example of block 2512, post-processing module 110 detects presence of training sequence 112 in received data symbols 122 by identifying a peak in an autocorrelation function or a cross-correlation function. In a block 2514 of method 2500, a position of a received data frame is identified from the presence of the training sequence. In an example of block 2514, post-processing module 110 identifies a beginning of received data frame 124 from presence of training sequence 112 in received data symbols 122.

Features described above may be combined in various ways without departing from the scope hereof. The following examples illustrate some possible combinations.

(A1) A method for synchronizing a data frame and data symbols in a communication system may include (1) detecting a presence of a training sequence including a serial sequence of data symbols that are conjugate symmetric, in a stream of a plurality of received data symbols, and (2) identifying a position of a data frame from the presence of the training sequence.

(A2) In the method denoted as (A1), the position of the data frame may be a beginning of the data frame.

(A3) In the method denoted as (A1), the position of the data frame may be either a midpoint of the data frame or an end of the data frame.

(A4) In any one of the methods denoted as (A1) through (A3), detecting the presence of the training sequence may include determining an autocorrelation value between (a) a first sliding window sample of the plurality of received data symbols and (b) and a second sliding window sample of the plurality of received data symbols.

(A5) The method denoted as (A4) may further include detecting the presence of the training sequence in response to detecting a peak value of the autocorrelation value.

(A6) In any one of the methods denoted as (A4) and (A5), the training sequence may include a first set of data symbols and a second set of data symbols, and each data symbol of the second set of data symbols may be a complex conjugate of a respective data symbol of the first set of data symbols.

(A7) In the method denoted as (A6), the first sliding window sample may have a length equal to a length of the first set of data symbols, and the second sliding window sample may have a length equal to a length of the second set of data symbols.

(A8) In any one of the methods, denoted as (A1) though (A3), detecting the presence of the training sequence may include determining a cross-correlation value between (a) a sliding window sample of the plurality of received data symbols and (b) and a copy of the training sequence.

(B1) A method for incorporating synchronization data symbols in a data frame of a communication system may include (1) generating a training sequence including a serial sequence of data symbols that are conjugate symmetric and (2) inserting the training sequence in a predetermined position of a data frame to be transmitted by the communication system, for use in identifying of a position of the data frame.

(B2) In the method denoted as (B1), the predetermined position of the data frame may be a beginning of the data frame.

(B3) In any one of the methods denoted as (B1) and (B2), generating the training sequence may include modulating each data symbol of the training sequence according to a phase shift keying modulation scheme.

(B4) In any one of the methods denoted as (B1) and (B2), generating the training sequence may include modulating each data symbol of the training sequence according to a quadrature amplitude modulation scheme.

(B5) In any one of the methods denoted as (B1) through (B4), the training sequence may include a first set of data symbols and a second set of data symbols, and each data symbol of the second set of data symbols may be a complex conjugate of a respective data symbol of the first set of data symbols.

(B6) In the method denoted as (B5), the training sequence may further include a null data symbol.

(B7) In any one of the methods denoted as (B1) through (B6), the data frame may include at least two dimensions, and inserting the training sequence in the predetermined position of the data frame may include inserting the training sequence in only a single dimension of the data frame.

(C1) A method for synchronizing a data frame and data symbols in a communication system may include (1) generating a training sequence including a serial sequence of data symbols that are conjugate symmetric, (2) inserting the training sequence in a transmitter-side data frame, (3) at a transmitter, converting constituent data symbols of the transmitter-side data frame to communication signals, (4) transmitting the communication signals from the transmitter to a receiver, (5) at the receiver, converting the communication signals to a stream of received data symbols, (6) detecting presence of the training sequence in the stream of received data symbols, and (7) identifying a position of a received data frame from the presence of the training sequence.

(C2) In the method denoted as (C1), transmitting the communication signals from the transmitter to the receiver may include transmitting the communication signals via an optical cable.

(C3) In the method denoted as (C1), transmitting the communication signals from the transmitter to the receiver may include transmitting the communication signals via a wireless communication link.

(C4) In the method denoted as (C1), transmitting the communication signals from the transmitter to the receiver may include transmitting the communication signal via an electrical cable.

(C5) In any one of the methods denoted as (C1) through (C4), the position of the received data frame may be a beginning of the received data frame.

(C6) In any one of the methods denoted as (C1) through (C5), the training sequence may include a first set of data symbols and a second set of data symbols, and each data symbol of the second set of data symbols may be a complex conjugate of a respective data symbol of the first set of data symbols.

Changes may be made in the above methods, devices, and systems without departing from the scope hereof. It should thus be noted that the matter contained in the above description and shown in the accompanying drawings should be interpreted as illustrative and not in a limiting sense. The following claims are intended to cover generic and specific features described herein, as well as all statements of the scope of the present method and system, which as a matter of language, might be said to fall therebetween.

What is claimed is:

1. A method for synchronizing a data frame and data symbols in a communication system, comprising:
   detecting a presence of a training sequence including a serial sequence of data symbols that are conjugate symmetric, in a stream of a plurality of received data symbols, the training sequence including a first set of data symbols and a second set of data symbols, each data symbol of the second set of data symbols being a complex conjugate of a respective data symbol of the first set of data symbols; and
   identifying a position of a data frame from the presence of the training sequence.

2. The method of claim 1, wherein the position of the data frame is a beginning of the data frame.

3. The method of claim 1, wherein the position of the data frame is either a midpoint of the data frame or an end of the data frame.

4. The method of claim 1, wherein detecting the presence of the training sequence comprises determining an autocorrelation value between (a) a first sliding window sample of the plurality of received data symbols and (b) and a second sliding window sample of the plurality of received data symbols.

5. The method of claim 4, further comprising detecting the presence of the training sequence in response to detecting a peak value of the autocorrelation value.

6. The method of claim 4, wherein:
   the first sliding window sample has a length equal to a length of the first set of data symbols; and
   the second sliding window sample has a length equal to a length of the second set of data symbols.

7. The method of claim 1, wherein detecting the presence of the training sequence comprises determining a cross-correlation value between (a) a sliding window sample of the plurality of received data symbols and (b) and a copy of the training sequence.

8. A method for incorporating synchronization data symbols in a data frame of a communication system, comprising:
   generating a training sequence including a serial sequence of data symbols that are conjugate symmetric, the training sequence including a first set of data symbols and a second set of data symbols, each data symbol of the second set of data symbols being a complex conjugate of a respective data symbol of the first set of data symbols; and
   inserting the training sequence in a predetermined position of a data frame to be transmitted by the communication system, for use in identifying a position of the data frame.

9. The method of claim 8, wherein the predetermined position of the data frame is a beginning of the data frame.

10. The method of claim 8, wherein generating the training sequence comprises modulating each data symbol of the training sequence according to a phase shift keying modulation scheme.

11. The method of claim 8, wherein generating the training sequence comprises modulating each data symbol of the training sequence according to a quadrature amplitude modulation scheme.

12. The method of claim 8, wherein the training sequence further includes a null data symbol.

13. The method of claim 8, wherein:
   the data frame comprises at least two dimensions; and
   inserting the training sequence in the predetermined position of the data frame comprises inserting the training sequence in only a single dimension of the data frame.

14. A method for synchronizing a data frame and data symbols in a communication system, comprising:
   generating a training sequence including a serial sequence of data symbols that are conjugate symmetric, the training sequence including a first set of data symbols and a second set of data symbols, and each data symbol of the second set of data symbols being a complex conjugate of a respective data symbol of the first set of data symbols;
   inserting the training sequence in a transmitter-side data frame;
   at a transmitter, converting constituent data symbols of the transmitter-side data frame to communication signals;
   transmitting the communication signals from the transmitter to a receiver;
   at the receiver, converting the communication signals to a stream of received data symbols;
   detecting presence of the training sequence in the stream of received data symbols; and
   identifying a position of a received data frame from the presence of the training sequence.

15. The method of claim 14, wherein transmitting the communication signals from the transmitter to the receiver comprises transmitting the communication signals via an optical cable.

16. The method of claim 14, wherein transmitting the communication signals from the transmitter to the receiver comprises transmitting the communication signals via a wireless communication link.

17. The method of claim 14, wherein transmitting the communication signals from the transmitter to the receiver comprises transmitting the communication signal via an electrical cable.

18. The method of claim 14, wherein the position of the received data frame is a beginning of the received data frame.

* * * * *